United States Patent
Kim et al.

(10) Patent No.: US 9,615,364 B2
(45) Date of Patent: Apr. 4, 2017

(54) METHOD FOR DIRECT DEVICE-TO-DEVICE COMMUNICATION OF TERMINAL IN IDLE MODE USING SIMILAR RANDOM ACCESS PROCEDURES, AND DEVICE THEREFOR

(71) Applicant: LG ELECTRONICS INC., Seoul (KR)

(72) Inventors: Hakseong Kim, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/896,274

(22) PCT Filed: Jul. 1, 2014

(86) PCT No.: PCT/KR2014/005860
§ 371 (c)(1),
(2) Date: Dec. 4, 2015

(87) PCT Pub. No.: WO2015/002439
PCT Pub. Date: Jan. 8, 2015

(65) Prior Publication Data
US 2016/0150507 A1 May 26, 2016

Related U.S. Application Data

(60) Provisional application No. 61/841,895, filed on Jul. 1, 2013, provisional application No. 61/843,463, filed (Continued)

(51) Int. Cl.
*H04B 7/00* (2006.01)
*H04W 72/04* (2009.01)
(Continued)

(52) U.S. Cl.
CPC ......... *H04W 72/042* (2013.01); *H04W 4/005* (2013.01); *H04W 4/06* (2013.01);
(Continued)

(58) Field of Classification Search
CPC ... H04W 4/08; H04W 72/02; H04W 74/0833; H04W 84/18; H04W 88/02; H04W 92/10; H04L 67/1044; H04M 1/7253
(Continued)

(56) References Cited

U.S. PATENT DOCUMENTS 7,548,758 B2   6/2009   Periyalwar et al.
2009/0017801 A1   1/2009   Laroia et al.
(Continued)

FOREIGN PATENT DOCUMENTS

KR   10-2009-0005647 A   1/2009
KR   10-2010-0043227 A   4/2010
(Continued)

OTHER PUBLICATIONS

Huawei et al., "Physical layer options for D2D discovery," 3GPP TSG RAN WG1 Meeting #73, Fukuoka, Japan, May 20-24, 2013 (downloaded by EPO on May 11, 2013), R1-131864, XP050697651, 8 pages.

*Primary Examiner* — Huy C Ho
(74) *Attorney, Agent, or Firm* — Birch, Stewart, Kolasch & Birch, LLP

(57) ABSTRACT

The present document discloses a method for transmitting/receiving signals using direct device-to-device (D2D) communication by using similar random access procedures in a wireless communication system, and a device therefor. To this end, one aspect of the present invention provides a method whereby a base station supports the device-to-device (D2D) communication of a terminal in idle mode in a wireless communication system, the base station according
(Continued)

to the method: receiving a first message, which corresponds to one among a predetermined number of signatures for D2D communication, from a D2D transmission terminal; and transmitting a second message, which comprises control information for D2D signal reception, to one or more D2D reception terminals including a terminal in idle mode, wherein the second message allows the terminal in idle mode to receive a third message comprising a D2D broadcast or groupcast signal transmitted by the D2D transmission terminal.

14 Claims, 25 Drawing Sheets

Related U.S. Application Data on Jul. 8, 2013, provisional application No. 61/843,886, filed on Jul. 8, 2013, provisional application No. 61/843,888, filed on Jul. 8, 2013, provisional application No. 61/843,889, filed on Jul. 8, 2013.

(51) Int. Cl.
  *H04W 4/00* (2009.01)
  *H04W 4/06* (2009.01)
  *H04W 74/08* (2009.01)
  *H04W 76/02* (2009.01)
  *H04B 5/00* (2006.01)

(52) U.S. Cl.
  CPC ....... *H04W 72/04* (2013.01); *H04W 74/0833* (2013.01); *H04W 76/023* (2013.01)

(58) Field of Classification Search
  USPC ........................................................ 455/518
  See application file for complete search history.

(56) References Cited

U.S. PATENT DOCUMENTS

| | | |
|---|---|---|
| 2009/0017807 A1 | 1/2009 | Kwon et al. |
| 2009/0017843 A1 | 1/2009 | Laroia et al. |
| 2011/0182280 A1 | 7/2011 | Charbit et al. |
| 2011/0275382 A1 | 11/2011 | Hakola et al. |
| 2012/0163252 A1 | 6/2012 | Ahn et al. |
| 2013/0053084 A1* | 2/2013 | Cho ............... H04W 4/005 455/515 |
| 2013/0107801 A1 | 5/2013 | Zheng |
| 2013/0157670 A1 | 6/2013 | Koskela et al. |
| 2013/0260801 A1 | 10/2013 | Kim et al. |
| 2013/0315196 A1 | 11/2013 | Lim et al. |
| 2014/0179330 A1 | 6/2014 | Du et al. |
| 2014/0213306 A1* | 7/2014 | Blankenship ........ H04B 5/0031 455/457 |
| 2014/0286284 A1 | 9/2014 | Lim et al. |
| 2015/0071189 A1 | 3/2015 | Park et al. |
| 2015/0341971 A1* | 11/2015 | Fodor ................ H04W 76/023 370/280 |

FOREIGN PATENT DOCUMENTS

| | | |
|---|---|---|
| KR | 10-2012-0061739 A | 6/2012 |
| KR | 10-2012-0062898 A | 6/2012 |
| KR | 10-2012-0074251 A | 7/2012 |
| KR | 10-2013-0048710 A | 5/2013 |
| KR | 10-2013-0065225 A | 6/2013 |
| WO | WO 2012/046173 A1 | 4/2012 |
| WO | WO 2012/111911 A2 | 8/2012 |
| WO | WO 2012/159270 A1 | 11/2012 |
| WO | WO 2013/013510 A1 | 1/2013 |
| WO | WO 2013/025040 A2 | 2/2013 |
| WO | WO 2013/062310 A1 | 5/2013 |
| WO | WO 2013/091229 A1 | 6/2013 |

* cited by examiner

METHOD FOR DIRECT DEVICE-TO-DEVICE COMMUNICATION OF TERMINAL IN IDLE MODE USING SIMILAR RANDOM ACCESS PROCEDURES, AND DEVICE THEREFOR

CROSS REFERENCE TO RELATED APPLICATIONS

This application is the National Phase of PCT International Application No. PCT/KR2014/005860, filed on Jul. 1, 2014, which claims priority under 35 U.S.C. 119(e) to U.S. Provisional Application No. 61/841,895 filed on Jul. 1, 2013, 61/843,463 filed on Jul. 8, 2013, 61/843,886 filed on Jul. 8, 2013, 61/843,888 filed on Jul. 8, 2013, and 61/843,889 filed on Jul. 8, 2013, all of which are hereby expressly incorporated by reference into the present application.

TECHNICAL FIELD

The present invention relates to a wireless communication system and, more particularly, to a method for transmitting and receiving signals using device-to-device communication by an idle device in a wireless communication system and an apparatus therefor.

BACKGROUND ART

As an example of a wireless communication system to which the present invention is applicable, a 3rd generation partnership project (3GPP) long term evolution (LTE) communication system will be schematically described.

FIG. 1 is a schematic diagram showing a network structure of an evolved universal mobile telecommunications system (E-UMTS) as an example of a wireless communication system.

The E-UMTS is an evolved form of the legacy UMTS and has been standardized in the 3GPP. In general, the E-UMTS is also called an LTE system. For details of the technical specification of the UMTS and the E-UMTS, refer to Release 7 and Release 8 of "3rd Generation Partnership Project; Technical Specification Group Radio Access Network".

Referring to FIG. 1, the E-UMTS includes a user equipment (UE), an evolved node B (eNode B or eNB), and an access gateway (AG) which is located at an end of an evolved UMTS terrestrial radio access network (E-UTRAN) and connected to an external network. The eNB may simultaneously transmit multiple data streams for a broadcast service, a multicast service and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Wireless communication of the above legacy LTE communication system focuses on a communication scheme between an eNode B (eNB) and a UE. However, recently, demand for technical development of a direct communication scheme between UEs has been increasing.

FIG. 2 is a diagram illustrating a concept of direct communication between UEs.

Referring to FIG. 2, UE1 and UE2 perform direct communication therebetween and UE3 and UE4 also perform direct communication therebetween. An eNB may control time/frequency resource locations, transmit power, etc. for direct communication between UEs through a proper control signal. Hereinafter, direct communication between UEs will be referred to as device-to-device (D2D) communication.

D2D communication has requirements different from a conventional LTE communication scheme in various aspects.

DISCLOSURE

Technical Problem

Based on the above-described discussion, the following description proposes a method for transmitting and receiving signals using D2D communication in a wireless communication system and an apparatus therefor.

Technical Solution

According to an aspect of the present invention, provided herein is a method for supporting a device-to-device (D2D) communication of an idle user equipment (UE) by a base station (BS) in a wireless communication system, including receiving a first message corresponding to one of a predetermined number of signatures for D2D communication from a D2D transmission (Tx) UE, and transmitting a second message including control information for reception of a D2D signal to one or more D2D reception (Rx) UEs including the idle UE, wherein the second message causes the idle UE to receive a third message including a D2D broadcast or groupcast signal transmitted by the D2D Tx UE.

According to another aspect of the present invention, provided herein is a method for receiving a device-to-device (D2D) signal by an idle user equipment (UE) in a wireless communication system, including receiving a second message including control information for reception of the D2D signal from a base station (BS) during an on-duration, and receiving a third message including a D2D broadcast or groupcast signal from a transmission (Tx) UE based on control information of the second message, wherein the second message is determined in consideration of a paging group of the idle UE.

According to a further aspect of the prevention, provided herein is method for performing a device-to-device (D2D) communication by an idle transmission user equipment (UE) in a wireless communication system, including transmitting, by the idle UE not radio resource control (RRC)-connected, a first message to a base station (BS) through a randomly selected resource among predetermined time-frequency resources by randomly selecting one of a predetermined number of signatures for D2D communication, receiving a second message including control information for transmission of a D2D broadcast or groupcast signal from the BS, and transmitting a third message including the D2D broadcast or groupcast signal to one or more reception (Rx) UEs using the control information received through the second message.

Advantageous Effects

According to embodiments of the present invention, D2D communication can be performed while efficiently relieving interference in a wireless communication system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BEST MODE

Hereinafter, structures, operations, and other features of the present invention will be readily understood from the embodiments of the present invention, examples of which are illustrated in the accompanying drawings. Embodiments, which will be described hereinbelow, are examples in which technical features of the present invention are applied to a 3GPP system.

Although embodiments of the present invention will be described based on an LTE system and an LTE-advanced (LTE-A) system, the LTE system and the LTE-A system are purely exemplary and the embodiments of the present invention may be applied to any communication system corresponding to the aforementioned definition.

In order to efficiently perform the above-described D2D communication scheme, radio resources for performing D2D communication should be able to be efficiently allocated to UEs. In particular, D2D communication requires a method for rapidly transmitting signals in an emergency situation without delaying the signals. The present disclosure provides a method for satisfying such demand.

To this end, overview for an operation in the LTE system, to which the present invention is applicable, is described first and a method for efficiently performing D2D communication using a random access channel (RACH) procedure in the LTE system is proposed.

Figure 1:
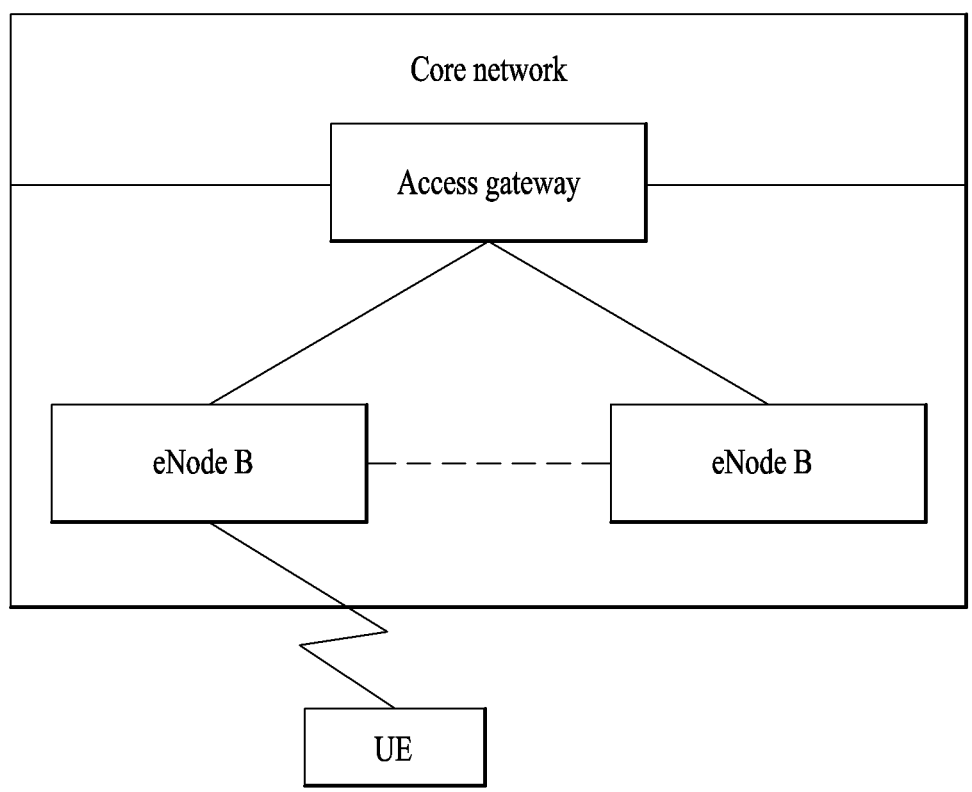
FIG. 1 is a schematic diagram illustrating a network structure of an evolved universal mobile telecommunications system (E-UMTS) as an example of a wireless communication system.
Figure 2:
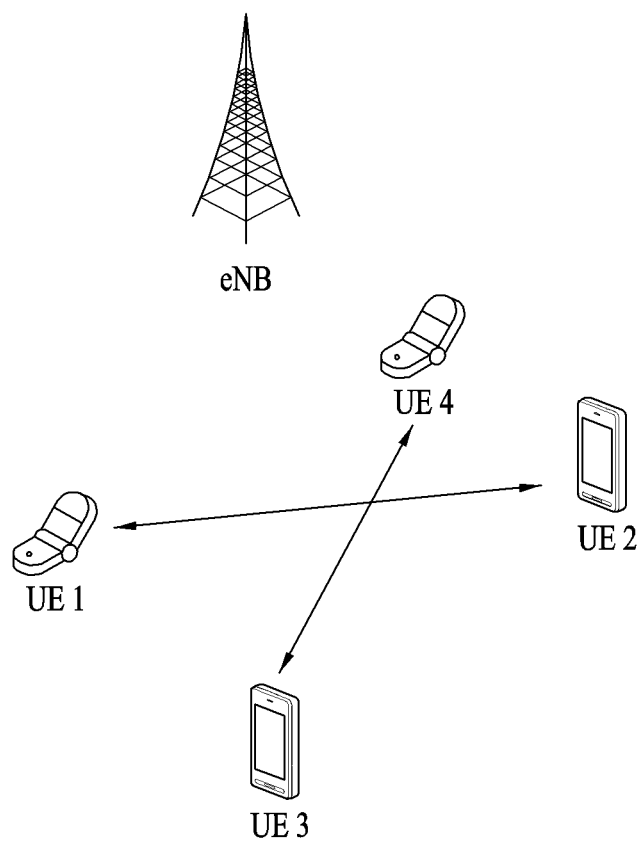
FIG. 2 is a diagram illustrating a concept of direct communication between UEs.
Figure 3:
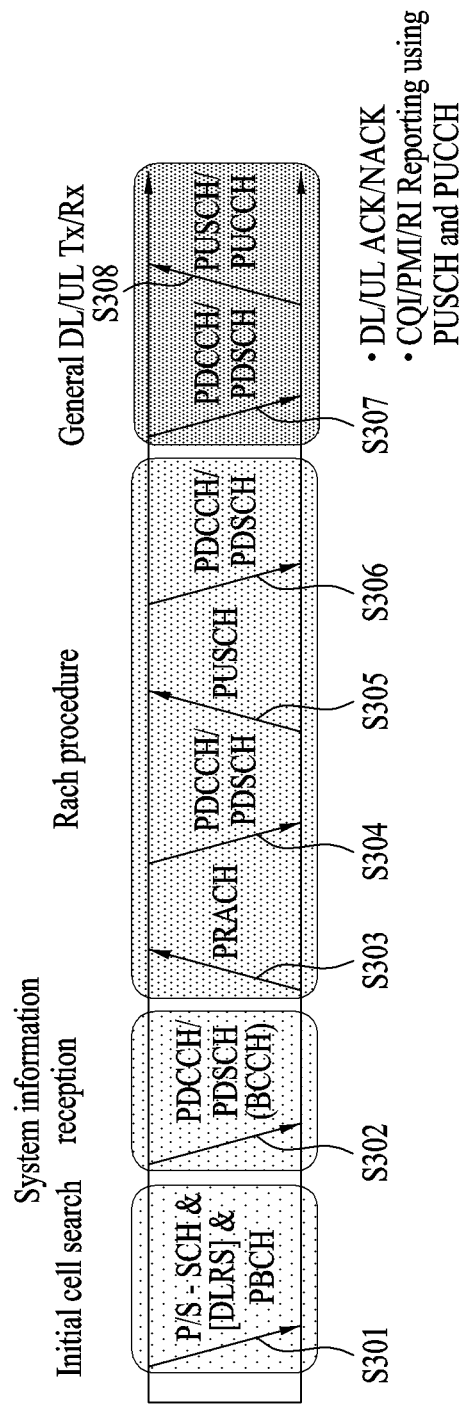
FIG. 3 is a diagram illustrating physical channels used in a 3GPP system and a general signal transmission method using the same.

FIG. 3 is a diagram illustrating physical channels used in a 3GPP system and a general signal transmission method using the same.

A UE performs initial cell search such as synchronization establishment with an eNB when the UE is powered on or enters a new cell (S301). To this end, the UE may receive a primary synchronization channel (P-SCH) and a secondary synchronization channel (S-SCH) from the eNB, establish synchronization with the eNB, and acquire information such as a cell identity (ID). Thereafter, the UE may receive a physical broadcast channel (PBCH) from the eNB to acquire information broadcast in the cell. Meanwhile, the UE may receive a DL reference signal (RS) in the initial cell search procedure to confirm a downlink channel state.

Upon completion of initial cell search, the UE may receive a physical downlink control channel (PDCCH) and a physical downlink shared channel (PDSCH) according to information carried in the PDCCH, thereby acquiring more detailed system information (S302).

Meanwhile, when the UE initially accesses the eNB or there are no radio resources for signal transmission, the UE may perform an RACH procedure with respect to the eNB (S303 to S306). To this end, the UE may transmit a specific sequence as a preamble through a physical random access channel (PRACH) (S03 and S305) and receive a response message to the preamble through the PDCCH and the PDSCH corresponding to the PDCCH (S304 and S306). In the case of a contention-based RACH, a contention resolution procedure may be additionally performed.

The UE which has performed the above procedures may receive the PDCCH and/or the PDSCH (S307) and transmit a physical uplink shared channel (PUSCH) and/or a physical uplink control channel (PUCCH) (S308) as a general UL/DL signal transmission procedure. In particular, the UE receives downlink control information (DCI) through the PDCCH.

The DCI includes control information such as resource assignment information for the UE and a format thereof differs according to usage thereof.

Meanwhile, control information that the UE transmits to the eNB through UL or control information that the UE receives from the eNB includes a DL/UL acknowledgement (ACK)/negative ACK (HACK) signal, a channel quality indicator (CQI), a precoding matrix index (PMI), a rank indicator (RI), etc. In the 3GPP LTE system, the UE may transmit the control information such as CQI/PMI/RI through the PUSCH and/or the PUCCH.

Figure 4:
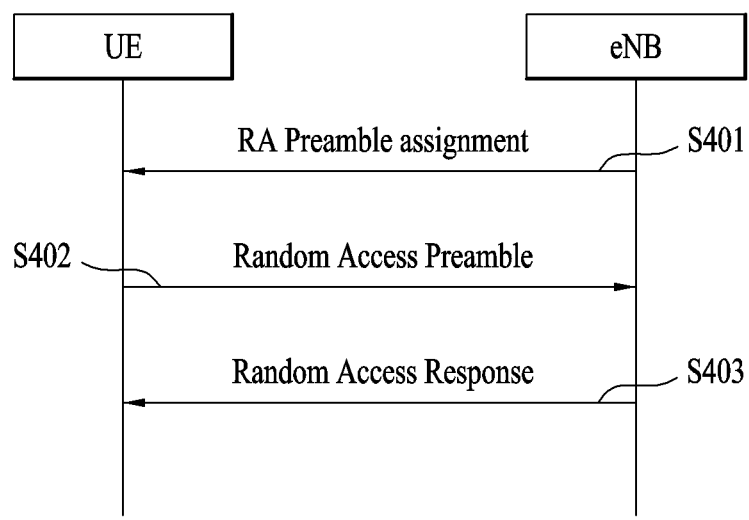
FIGS. 4 and 5 are diagrams for explaining in detail an RACH procedure used in the present invention.
Figure 5:
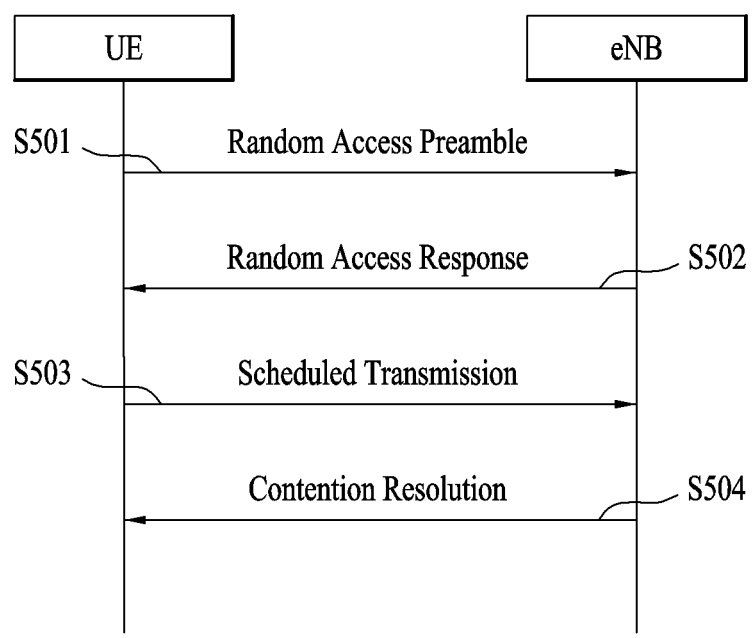

FIGS. 4 and 5 are diagrams for explaining in detail an RACH procedure to be used in the present invention.

First, the UE performs the RACH procedure,
  when the UE performs initial access without radio resource control (RRC) connection with the eNB,
  when the UE initially accesses a target cell during handover,
  when the RACH procedure is requested by a command of the eNB,
  when UL time synchronization has not been established or there is data to be transmitted on UL in a situation in which no specified radio resources used to request radio resources are allocated, or
  when a recovery procedure is performed due to radio link failure or handover failure.

In a process of selecting a random access preamble, an LTE system provides both a contention based RACH procedure in which the UE selectively uses any one random access preamble in a specific set and a non-contention based RACH procedure in which the UE uses a random access preamble allocated thereto by the eNB. However, the non-contention based RACH procedure may be used only during the handover process or at the request of the eNB through a command.

Meanwhile, an RACH procedure that a UE performs with respect to a specific eNB may include (1) a process of transmitting a random access preamble to the eNB (hereinafter, a first message (message 1) transmission process unless confusion occurs), (2) a process of receiving a random access response message from the eNB in response to the random access preamble (hereinafter, a second message (message 2) reception process unless confusion occurs), (3) a process of transmitting a UL message using information received in the random access response message (hereinafter, a third message (message 3) transmission process unless confusion occurs), and (4) a process of receiving a message in response to the UL message from the eNB (hereinafter, a fourth message (message 4) reception process unless confusion occurs).

FIG. 4 is a diagram illustrating a detailed operation process between a UE and an eNB in a non-contention based RACH procedure.

(1) Random Access Preamble Assignment

As described above, the non-contention based RACH procedure may be performed (1) during a handover process and (2) at the request of the eNB through a command. It is apparent that a contention based RACH procedure may be performed even in the above two cases.

First, for the non-contention based RACH procedure, it is important for the UE to receive a designated random access preamble having no possibility of contention from the eNB. A method indicating the random access preamble includes a method indicating the random access preamble through a handover command and a method indicating the random access preamble through a PDCCH command. Thus, the UE receives the random access preamble (S401).

(1) Transmission of First Message

The UE receives the random access preamble allocated only thereto from the eNB as described above and then transmits the preamble to the eNB (S402).

(2) Reception of Second Message

After transmitting the random access preamble in step S402, the UE attempts to receive a random access response within a random access response reception window indicated by the eNB through system information or a handover command (S403). More specifically, the random access response may be transmitted in the form of a media access control (MAC) packet data unit (PDU) and the MAC PDU may be delivered over a PDSCH. To properly receive information transmitted over the PDSCH, the UE desirably monitors a PDCCH. That is, the PDCCH desirably includes information about a UE that should receive the PDSCH, frequency and time information of radio resources of the PDSCH, and a transmission format of the PDSCH. Once the UE successfully receives the PDCCH transmitted thereto, the UE may properly receive the random access response over the PDSCH according to information carried over the PDCCH. The random access response may include a random access preamble ID (e.g. a random access radio network temporary identity (RA-RNTI)), a UL grant indicating UL radio resources, a temporary cell ID (temporary C-RNTI), and a timing advance command (TAC).

Because one random access response may contain random access response information for one or more UEs, the random access preamble ID is needed in the random access response to indicate for which UE the UL grant, the temporary C-RNTI, and the TAC are valid. It is assumed in this step that the UE selects a random access preamble ID corresponding to the random access preamble selected thereby in step S402.

In the non-contention based RACH procedure, the UE may determine that the RACH procedure has been normally performed by receiving the random access response information and completes the RACH procedure.

FIG. 5 is a diagram for explaining an operation process between a UE and an eNB in a contention based RACH procedure.

(1) Transmission of First Message

First, the UE may randomly select one random access preamble from a set of random access preambles indicated through system information or a handover command and selectively transmit a PRACH resource on which the random access preamble can be transmitted (S501)

(2) Reception of Second Message

A method of receiving random access response information is similar to that in the above-described non-contention based RACH procedure. That is, after transmitting the random access preamble as in step S401, the UE attempts to receive a random access response within a random access response reception window indicated by the eNB through the system information or the handover command and receives a PDSCH through a corresponding RA-RNTI (S402) (?S502). Then, the UE may receive a UL grant, a temporary C-RNTI, and a TAC.

(3) Transmission of Third Message

Upon receipt of a valid random access response, the UE processes information included in the random access response. That is, the UE applies the TAC and stores the temporary C-RNTI. In addition, the UE transmits data (i.e. a third message) to the eNB using the UL grant (S403). The third message should include a UE ID. In the contention-based RACH procedure, since the eNB cannot judge which UE performs the RACH procedure, the eNB needs to identify the UE performing the RACH procedure to avoid later contention among UEs.

Two methods have been discussed to include the ID of the UE in the third message. One method is that if the UE has a valid C-RNTI allocated by a corresponding cell prior to the RACH procedure, the UE transmits a C-RNTI thereof through a UL transmission signal corresponding to the UL grant. On the other hand, if the valid C-RNTI has not been allocated to the UE prior to the RACH procedure, the UE transmits a unique ID thereof (e.g. SAE temporary mobile subscribed identity (S-TMSI) or a random ID) in data. In general, the unique ID is longer than the C-RNTI. If the UE transmits data corresponding to the UL grant, the UE initiates a contention resolution timer.

(4) Reception of Fourth Message

After the UE transmits the data including an ID thereof according to the UL grant included in the random access response, the UE awaits reception of a command for contention resolution from the eNB. That is, the UE attempts to receive a PDCCH in order to receive a specific message (S404). For PDCCH reception, two methods have been considered. When the UE transmits the third message including an ID thereof using the C-RNTI according to the UL grant as described above, the UE attempts to receive the PDCCH using the C-RNTI. If the ID included in the third message matches the UE ID, the UE may attempt to receive the PDCCH using the temporary C-RNTI included in the random access response. In the former case, if the UE receives the PDCCH using the C-RNTI before expiration of the contention resolution timer, the UE determines that the RACH procedure has been normally performed and completes the RACH procedure. In the latter case, if the UE receives the PDCCH using the temporary C-RNTI before expiration of the CR timer, the UE checks data transmitted on a PDSCH indicated by the PDCCH. If the data includes the UE ID, the UE determines that the RACH procedure has been normally performed and completes the RACH procedure.

Resources for D2D communication may be allocated by an eNB. To this end, if a transmission (Tx) UE performing D2D communication requests that the eNB allocate radio resources and the eNB allocates the resources in response to the request, the Tx UE may transmit signals to one or more reception (Rx) UEs. In the following description, unlike such a normal D2D communication scheme or similar to an RACH procedure to be additionally described, a method in which the Tx UE initiates D2D communication by randomly accessing the eNB is proposed.

An embodiment of the present invention proposes a method for achieving D2D communication of a broadcast, groupcast, or group communication service scheme by changing the first to fourth messages of the conventional RACH procedure as follows. For convenience of description, the first to fourth messages may be denoted by msg1, msg2, msg3, and msg4 respectively.

In the following description, msg1, msg2, msg3, and msg4 indicate information or signals transmitted in respective steps described below. The following steps are generally applied procedures in a variety of proposed methods and the procedures may not be necessarily identical to a specific proposed method. However, for convenience of description, the steps are classified as follows.

Msg1 (Step 1):

Step 1 may define a signal indicating that transmission of a broadcast/groupcast signal (which is to be transmitted in Step 3) will be attempted later according to a determined rule. The signal mentioned herein may be referred to as msg1 for convenience. This signal may be transmitted from a D2D UE to a specific eNB. Depending on methods, other D2D UEs may receive msg1 (overhearing).

Msg2 (Step 2):

Step 2 transmits information necessary for a D2D UE that has requested Step 1 to transmit information a broadcast/groupcast signal (e.g., resource allocation, power control, timing advance, cyclic prefix (CP) length, etc.) corresponding to msg3 as a response of an eNB to Step 1. The signal (? the information) mentioned herein may be referred to as msg2.

Msg3 (Step 3):

Step 3 is a process in which a D2D Tx UE that has requested Step 1 transmits a broadcast/groupcast signal to D2D Rx UEs. In some cases, the broadcast/groupcast signal may be transmitted to restricted D2D Rx UEs (a group of restricted UEs) (Rx UEs are limited). In other cases, the eNB may be configured to receive the broadcast/groupcast signal to perform a proper operation (relaying or repeated transmission). The signal mentioned herein may be referred to as msg3.

Msg4 (Step 4):

Step 4 is an operation for assisting Step 3 so that Step 3 can be normally performed and performs a related operation according to whether the signal in Step 3 has been successfully received or according to which channel has been incorrectly received to some degree when the signal in Step 3 has not been normally received. In some cases, the eNB may broadcast/groupcast the message (msg3) which has been transmitted in Step 3 to D2D Rx UEs or an Rx UE group at a transmission timing of Step 4. The signal mentioned herein may be referred to as msg4.

The above-described steps are similar to a PRACH procedure as described below. However, the terms and procedures used in the PRACH procedure are purely introduced for convenience of description and overall operations and functions of the above steps may differ from those of the PRACH procedure. This means that the PRACH procedure and functions are reused unless specified otherwise in the following description.

An application example of a D2D communication scheme using the above-described steps (messages) will be described below with reference to the drawings.

Figure 6:
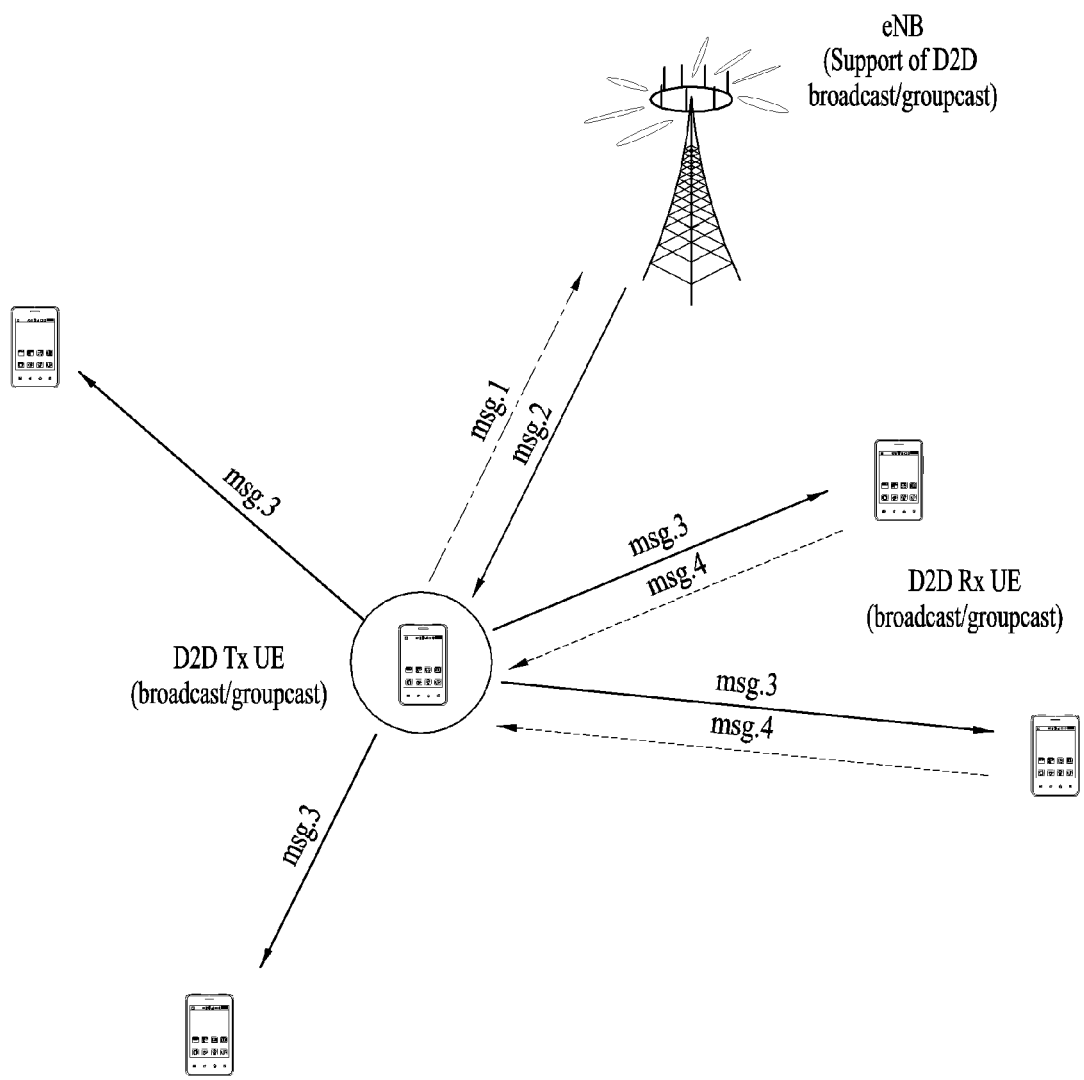
FIGS. 6 and 7 are diagrams illustrating a procedure for performing D2D communication through pseudo RACH procedure according to an example of the present invention.
Figure 7:
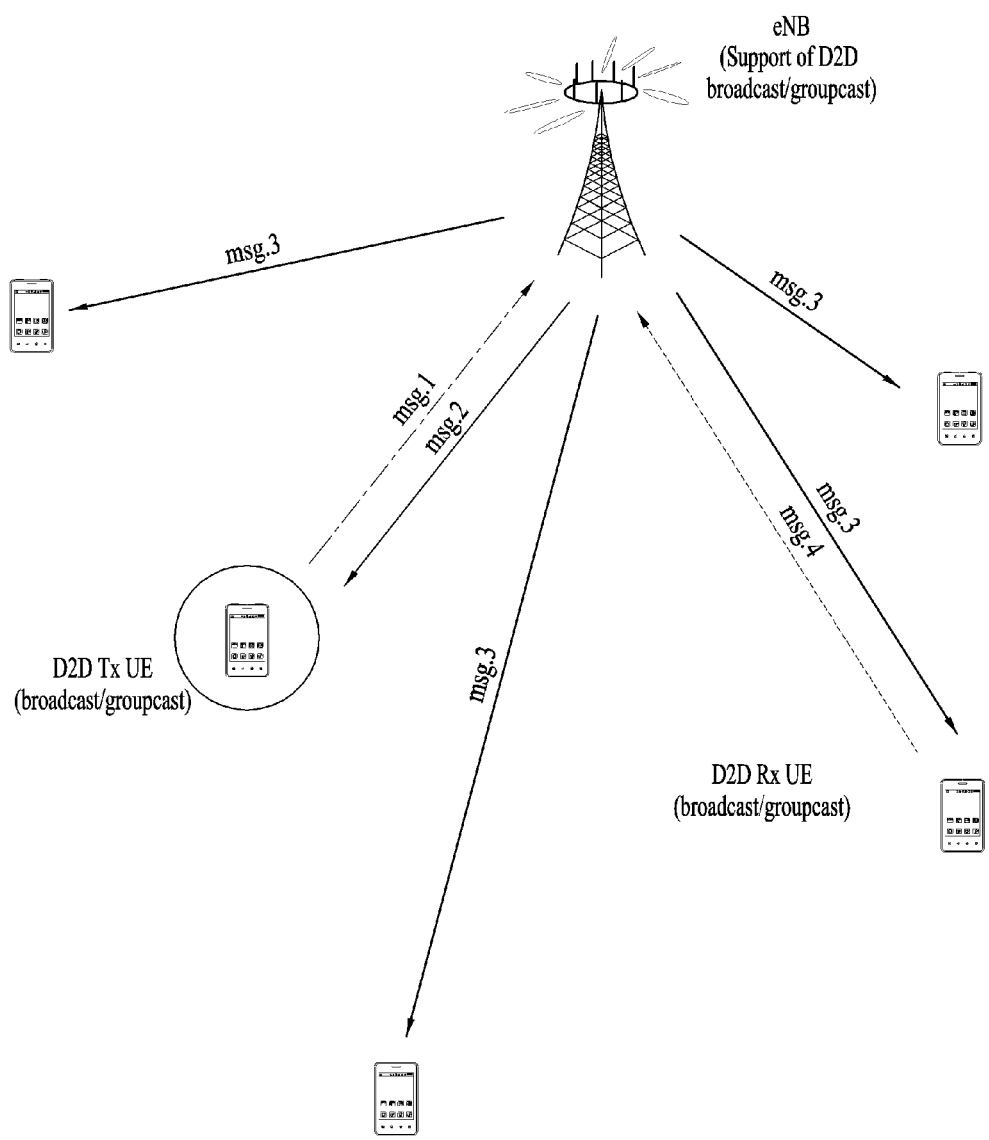

FIGS. 6 and 7 are diagrams illustrating a procedure for performing D2D communication through a pseudo RACH procedure according to an example of the present invention.

In FIGS. 6 and 7, a Tx UE may transmit msg1 similar to a random access preamble to an eNB in a preset resource region in order to initiate D2D communication. The eNB receiving msg1 from the Tx UE may be a serving eNB that provides a service to the Tx UE and may support broadcast/groupcast for D2D communication of the Tx UE.

In FIGS. 6 and 7, the eNB may transmit msg2 including information such as resource assignment for msg3 transmission of the Tx UE to the Tx UE as a response to msg1.

In the example illustrated in FIG. 6, the Tx UE which has received msg2 transmits msg3 to a predetermined group of Rx UEs. That is, in the example of FIG. 6, the Tx UE may directly transmit msg3 to the Rx UEs without passing through the eNB using resources etc. allocated through msg2. Upon receipt of msg3, the Rx UEs may transmit msg4 to the Tx UE, when necessary, to indicate whether msg3 has been successfully received.

Meanwhile, in the example illustrated in FIG. 7, the serving eNB, instead of the Tx UE, transmits msg3 to a predetermined group of Rx UEs as opposed to the example of FIG. 6. Upon receipt of msg3, the Rx UEs may transmit msg4 indicating whether msg3 has been successfully received to the eNB, when necessary.

Figure 8:
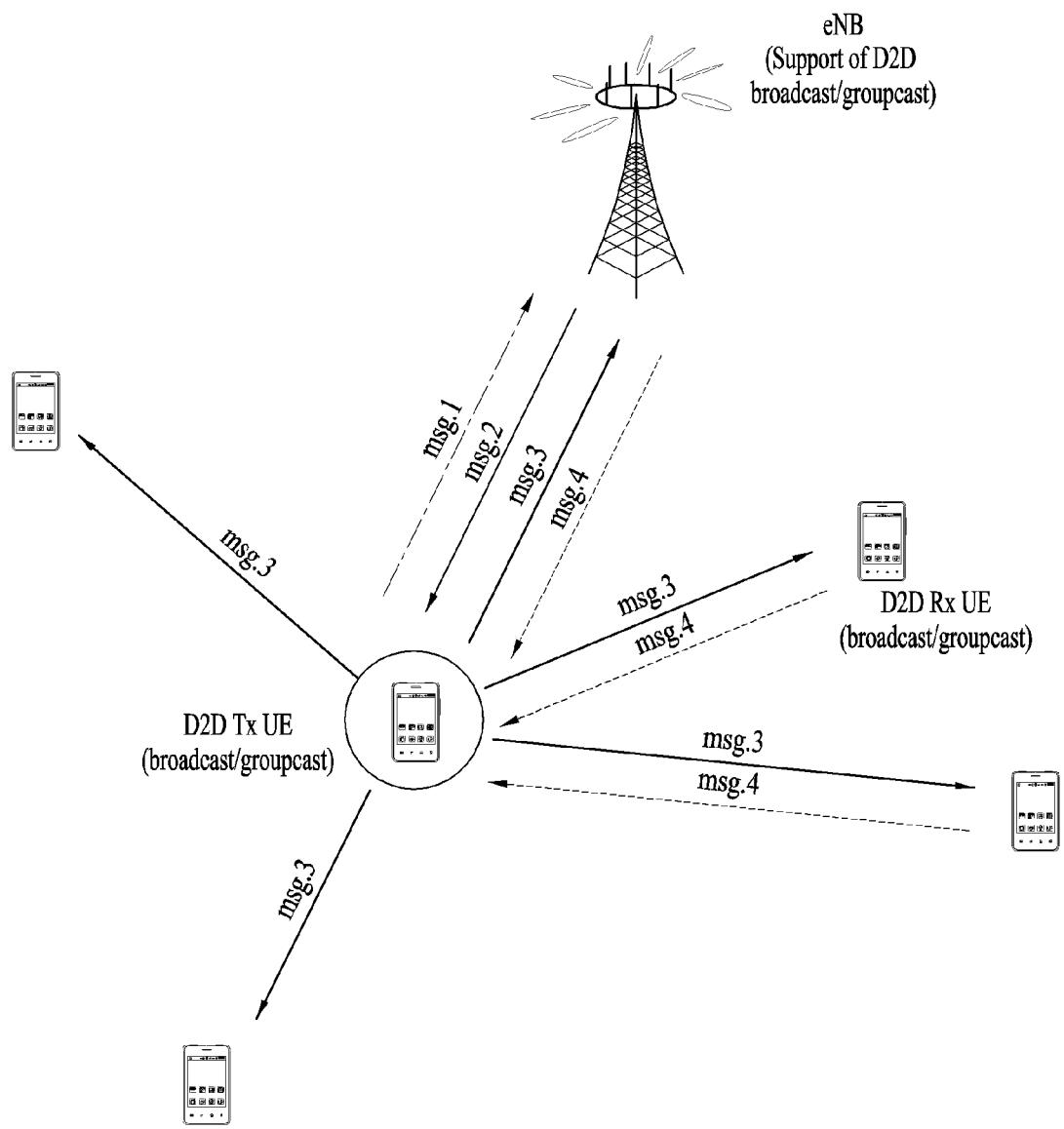
FIGS. 8 to 10 are diagrams illustrating a procedure for performing D2D communication through pseudo RACH procedure according to another example of the present invention.
Figure 9:
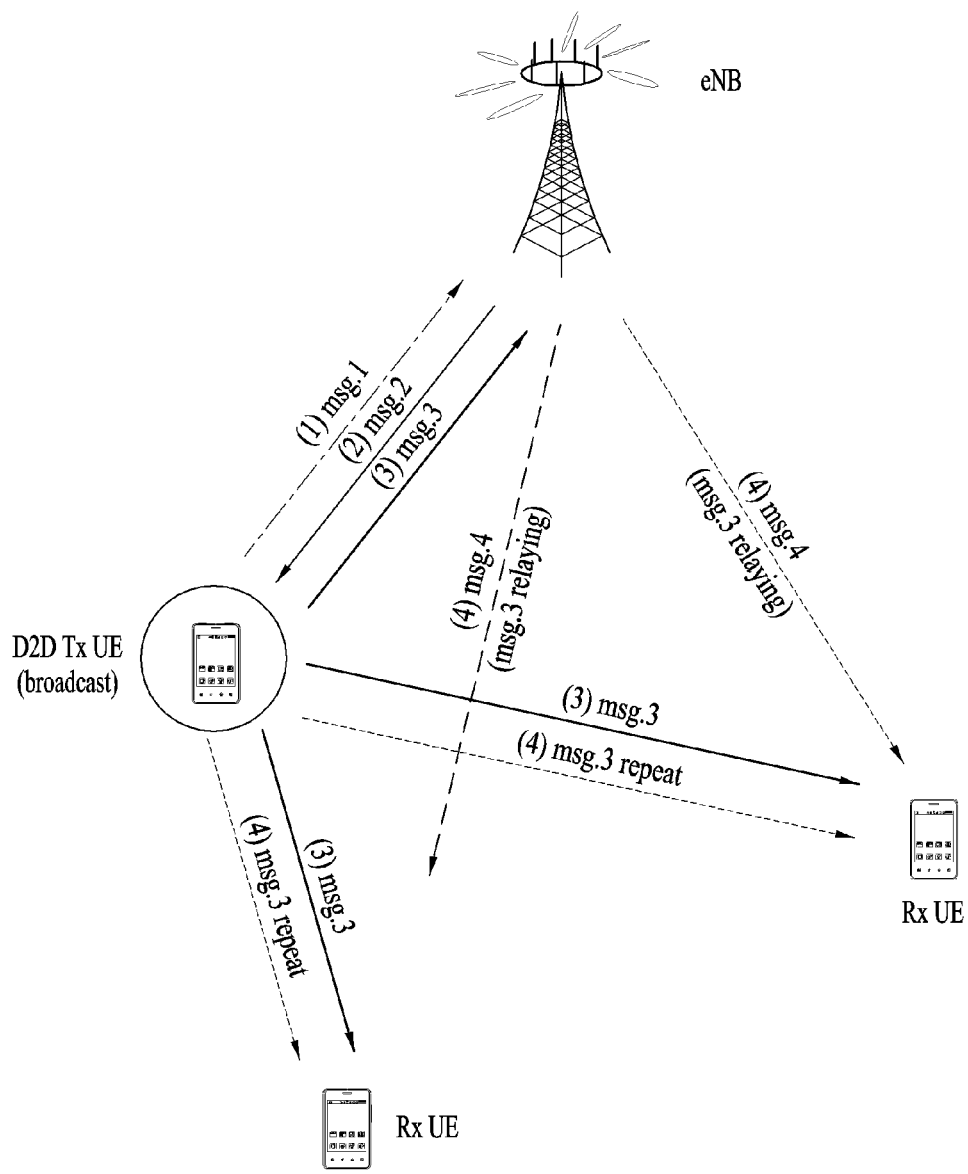
Figure 10:
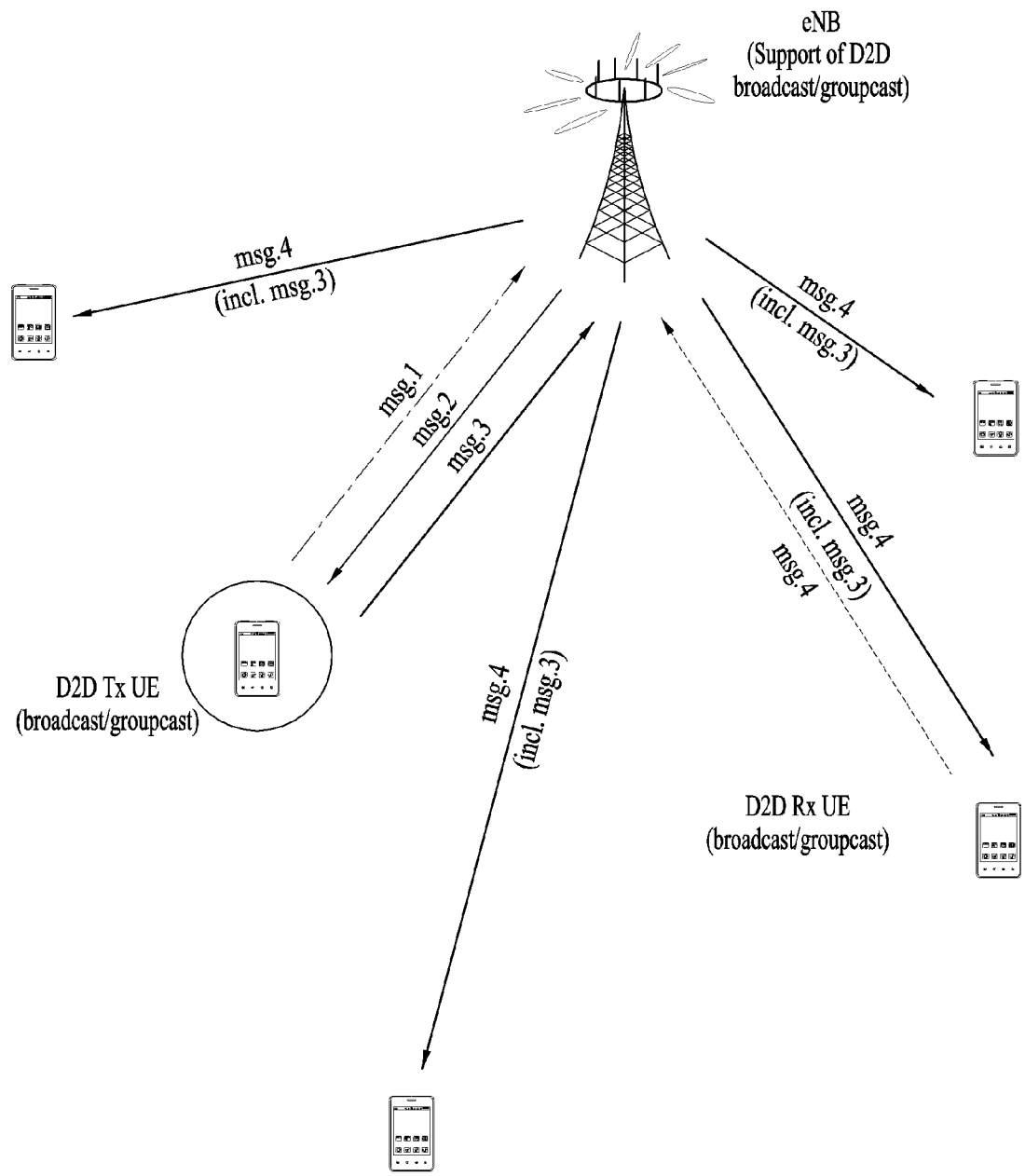

FIGS. 8 to 10 are diagrams illustrating a procedure for performing D2D communication through a pseudo RACH procedure according to another example of the present invention.

Similar to FIG. 6, the Tx UE directly transmits the broadcast/groupcast signal in FIG. 8. However, FIG. 8 additionally shows a process in which the serving eNB also receives msg3 transmitted by the Tx UE and, when necessary, transmits msg4. In this way, if the eNB receives msg3, the eNB as well as the Tx UE may also retransmit a hybrid automatic repeat request (HARQ) according to a HARQ retransmission request, which will be described below.

FIG. 9 illustrates a scheme in which the Tx UE and the eNB totally/selectively transmit the broadcast/groupcast signal (msg3). That is, the eNB may relay msg3 of the Tx UE and then the Rx UEs may combine signals of two paths. This scheme causes both the Tx UE and the eNB to transmit the broadcast/groupcast signals as illustrated in FIG. 9 after the Tx UE pre-transmits information about the broadcast/groupcast signal to the eNB or after the eNB overhears the information about the broadcast/groupcast signal, so that the Rx UEs may combine the signals.

Although the eNB relays the signal of the Tx UE in FIG. 9, another device as well as the eNB may perform the relaying function.

In a temporal procedure of the example of FIG. 9, it is desirable that a timing at which the Tx UE transmits (broadcasts) msg3 and a timing at which the eNB transmits msg4 be differently set. In FIG. 9, the eNB relays msg4 including msg3 to the Rx UEs after the Tx UE transmits msg3. In this case, the Tx UE may repeat transmission of msg3 at a corresponding timing.

In a time division duplex (TDD) system, since the same frequency is used, if the Tx UE and the eNB transmit msg3 at a msg3 transmission timing, the eNB should receive msg3 from the Tx UE and, at the same time, transmit msg3. Therefore, such design is undesirable because of difficulty in implementation. However, since it is possible not to perform simultaneous transmission even in the TDD system, the eNB may receive and store signals transmitted at different timings and use the signals to increase coding gain using chase combining (CC) or incremental redundancy (IR). From this viewpoint, a purpose of transmitting a broadcast message to the Rx UEs and a purpose of transmitting a msg3 message/content (for relaying broadcasting) to the eNB can be simultaneously achieved by transmitting msg3 once.

However, in a frequency division duplex (FDD) system, since the D2D Tx UE uses a UL spectrum and the eNB uses a DL spectrum, design on time is freer than the TDD system. Rather, the eNB may provide a service for relaying msg3 to the Rx UEs simultaneously while receiving msg3 from the Tx UE. Accordingly, during timing design, the FDD system has a part capable of reducing latency relative to the TDD system.

Meanwhile, simultaneous transmission of msg3 by the Tx UE at a transmission timing of msg4 by the eNB may be considered. By doing so, since the Rx UE receives signals combined by different transmitters on the same frequency, signal combination gain will be obtained. In this case, a transmission method using the same format may be simply used, superposition coding may be used, or a hybrid form of the two may be used.

Msg4 illustrated in this example may differ in role from msg4 in other examples. If the Tx UE thinks msg4 is a response to msg3, a reception timing of msg4 by the Tx UE (in the case in which a timing of D2D msg4 is predetermined like a transmission/reception timing of RACH message 4) should be different from a transmission timing of msg4 including msg3 by the eNB. After the eNB confirms that msg3 has been safely received from the Tx UE (original purpose of D2D msg4; msg4 in other example), the eNB should transmit msg4 at a transmission timing of specific msg4 (a new msg4 signal which has the same format as msg3 or is designed to include the contents of msg3) determined by a predetermined rule. Accordingly, msg4 including msg3 of the Tx UE, to be transmitted to the Rx UE, may be distinguished by being referred to as msg5 in the case in which msg4 is used in other examples.

In this case, if msg5 having the same format as msg3 is relayed or repeated, the Tx UE may also transmit msg3 at the same timing as illustrated in FIG. 9, thereby increasing gain. When msg5 having a different format from msg3 is transmitted, it is expected that the same combining gain will be acquired if the Tx UE generates msg5 having the different format and transmits msg5. In this case, transmission of msg5 may be repeated multiple times in consideration of paging and discontinuous reception (DRX) cycle of the Rx UE. Then, the Rx UE awakes from a sleep mode and may receive such a broadcast signal at least once.

Meanwhile, FIG. 10 illustrates an example in which although the Tx UE generates the broadcast/groupcast signal, the eNB actually transmits the signal to the Rx UEs. That is, the eNB receives broadcast information through msg3 from the D2D Tx UE and then directly broadcasts/groupcasts to the Rx UEs. In this case, gain in reduction of power consumption of the Tx UE is obtained.

In addition, in order to efficiently entrust the eNB with transmission of msg3, a scheme of transmitting msg1 including a broadcast message may be considered.

Hereinafter, more detailed examples based on the above description will be given. First, the case in which msg4 is needed and the case in which msg4 is not needed will be described in detail.

Figure 11:
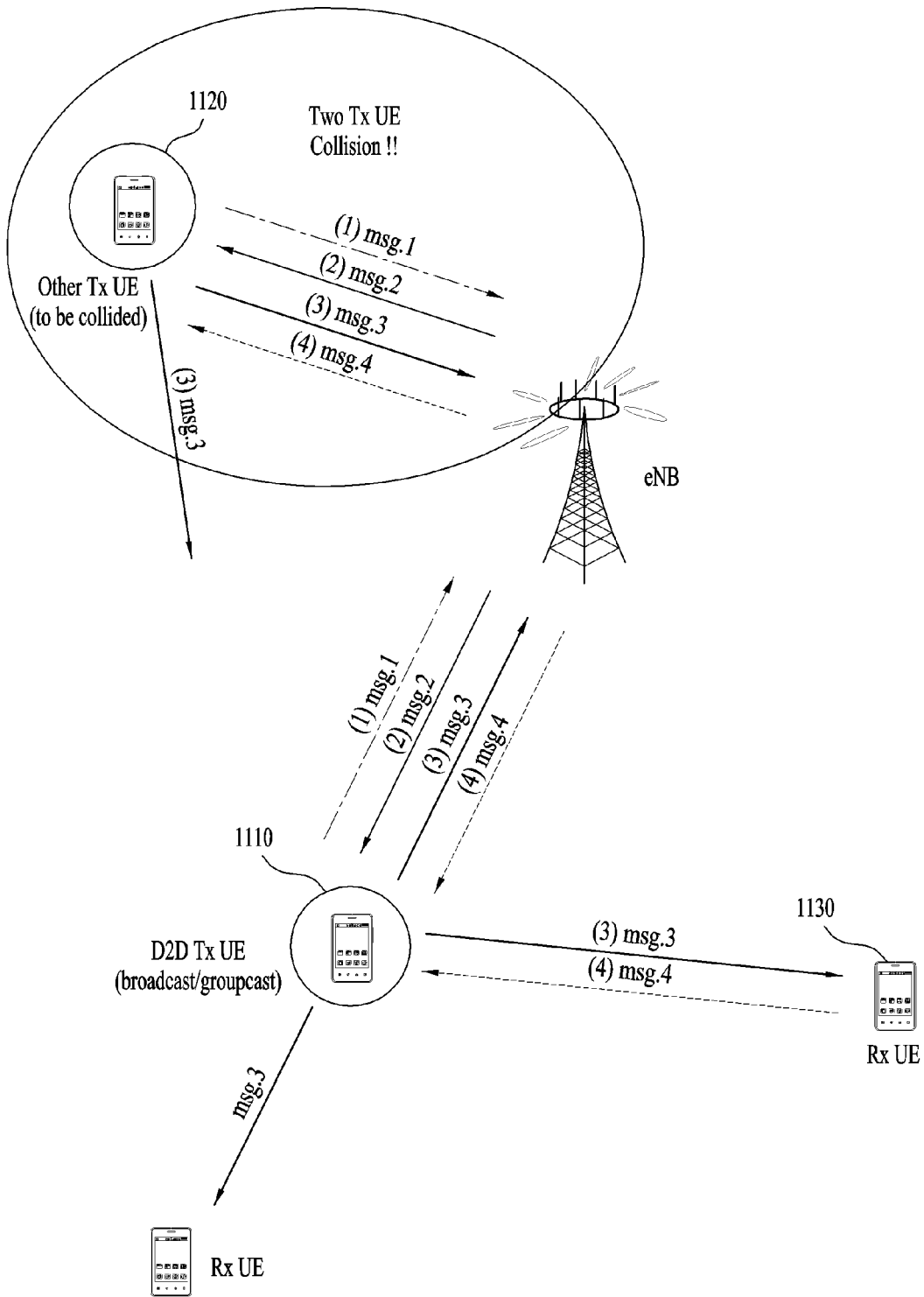
FIG. 11 is a diagram for explaining a situation in which two or more UEs attempt to simultaneously perform broadcast to thus generate collision in an example of the present invention.

FIG. 11 is a diagram for explaining a situation in which two or more UEs attempt to simultaneously perform broadcast to thus generate collision in an example of the present invention.

Specifically, a first D2D Tx UE 1110 and a second D2D Tx UE 1120 may simultaneously transmit msg1 to msg4 to an eNB according to a pseudo RACH procedure in order to start D2D broadcast. Msg1 transmitted by the first D2D Tx UE 1110 and msg1 transmitted by the second D2D Tx UE 1120 may not be distinguished by Tx UEs as in a random access preamble in LTE and may be designed to be distinguished only by a transmission timing and frequency of msg1. In this case, since the eNB transmits msg2 without distinguishing between the Tx UEs, collision may occur. Such collision may be resolved similarly to collision in LTE by exchanging msg3 and msg4 with the eNB. In this embodiment, it is assumed that collision is resolved by transmission of msg4 by an Rx UE as well as a contention resolution procedure with the eNB. That is, it is proposed that an Rx UE 1130 which has recognized that broadcast signals of two or more Tx UEs collide also transmit msg4, thereby resolving corresponding collision.

Hereinafter, a detailed configuration of msg1 to msg4 in a D2D communication scheme using the above-described pseudo RACH procedure will be described in more detail.

Msg 1

It is proposed that msg1 according to embodiments of the present invention be configured such that a Tx UE randomly selects an arbitrary signature among predetermined signatures received through system information similarly to the random access preamble of LTE and transmit the selected signature through a randomly selected resource among predetermined time-frequency resources.

System information about msg1 for D2D communication may be similar to a PRACH of LTE as follows. For convenience of description, the system information is referred to as D2D-PRACH configuration information but may be referred to by an arbitrary name.

TABLE 1

D2D-PRACH-Config information elements

```
-- ASN1START
D2D-PRACH-ConfigSIB ::=         SEQUENCE {
rootSequenceIndex               INTEGER (0..A),
D2d-prach-ConfigInfo            d2d-PRACH-ConfigInfo
}
d2d-PRACH-Config ::=            SEQUENCE {
rootSequenceIndex               INTEGER (0..A),
d2d-prach-ConfigInfo            d2d-PRACH-ConfigInfo
OPTIONAL    -- Need ON
}
D2d-PRACH-ConfigSCell-r10 ::=   SEQUENCE {
D2d-prach-ConfigIndex-r10       INTEGER (0..B)
}
D2d-PRACH-ConfigInfo ::=        SEQUENCE {
D2d-prach-ConfigIndex           INTEGER (0..B),
   highSpeedFlag                BOOLEAN,
   zeroCorrelationZoneConfig    INTEGER (0..C),
   D2d-prach-FreqOffset         INTEGER (0..D)
}
-- ASN1STOP
```

In the above-described system information, the number A of root indexes, the number B of physical configurations, the number C of zeroCorrelation zone configurations, and the number D of frequency offsets may have arbitrary values according to need. In addition, this is purely exemplary and part of the above system information may be omitted.

Msg 2 (Role of Msg2 as Schedule Command)

The following description is given for two cases under the assumption that a normal scheduling command and a scheduling command for (emergency) broadcasting may differ. The scheduling commands may be configured to differ in a scheme represented or interpreted by each bit field in each command according to purpose even though the commands have the same scheduling format. After decoding is performed first, an indicator field (e.g. one bit) for distinguishing between (emergency) broadcast and normal scheduling may be put in a corresponding field.

A. Msg2 Scheduling Command Content for Broadcast/Groupcast (Very simplified) resource assignment information
(Very simplified or truncated) modulation and coding scheme (MCS)
Hopping flag
Priority indicator (in case of emergency)
Power control command (or fixed/maximum power value as described later (configurable value)
Timing advance or partial time synchronization information
In-band emission information if necessary
UE ID based processing
Groupcast HARQ information
Priority counting information (fairness information)
Other field(s)

B. Msg2 Scheduling Command Content for Normal Scheduling (Very simplified) resource assignment information
(Very simplified or truncated) MCS
Hopping flag
Priority indicator (in case of non-emergency)
Power control command (or fixed/maximum power value as described later (configurable value)
Timing advance or partial time synchronization information
In-band emission information if necessary
UE ID based processing
Groupcast HARQ information
Priority counting information (fairness information)
Other field(s)

Meanwhile, if a random access response (RAR) based RACH scheduling command of a conventional RACH procedure is used, usage of the following fields may be differently configured.

20-Bit UL Grant (RAR Grant)
Hopping flag—1 bit
Fixed size resource block assignment—10 bits
Truncated MCS—4 bits
Transmit power control (TPC) command for PUSCH transmission—3 bits
UL latency—1 bit
CSI request—1 bit Since the 1-bit CSI request field has no probability of being actually used for D2D broadcast, coding gain may be obtained by setting the CSI request field to a specific bit and using the specific bit as a virtual coding bit. Alternatively, the CSI request field may be used as an indicator for distinguishing (emergency) broadcast/groupcast from others as mentioned above.

As an example, the CSI request field may be set as follows.

Bit state "A": (emergency) broadcast/groupcast scheduling grant
Bit state "B": normal scheduling grant Msg3 and Msg4

Msg3 and msg4 may correspond to a message that the Tx UE is to substantially transmit through broadcast and a reception response to the message, respectively, as described in the above procedure. Hereinafter, procedures and techniques that should be introduced to efficiently transmit a broadcast message will be additionally described.

A representative LTE broadcast message includes a PBCH that carries system information. Among LTE broadcast messages, a master information block (MIB) message maintains a very low coding rate using repeated coding in consideration of importance thereof.

Msg3, a D2D broadcast message, desirably maintains a low coding rate in the above aspect. A proposed method for maintaining a low coding rate is to sufficiently ensure a coding rate (? coding gain) by transmitting msg3 n times (where n=1, 2, . . . , N_repetition, configurable by a higher layer or physical layer signal).

Figure 12:
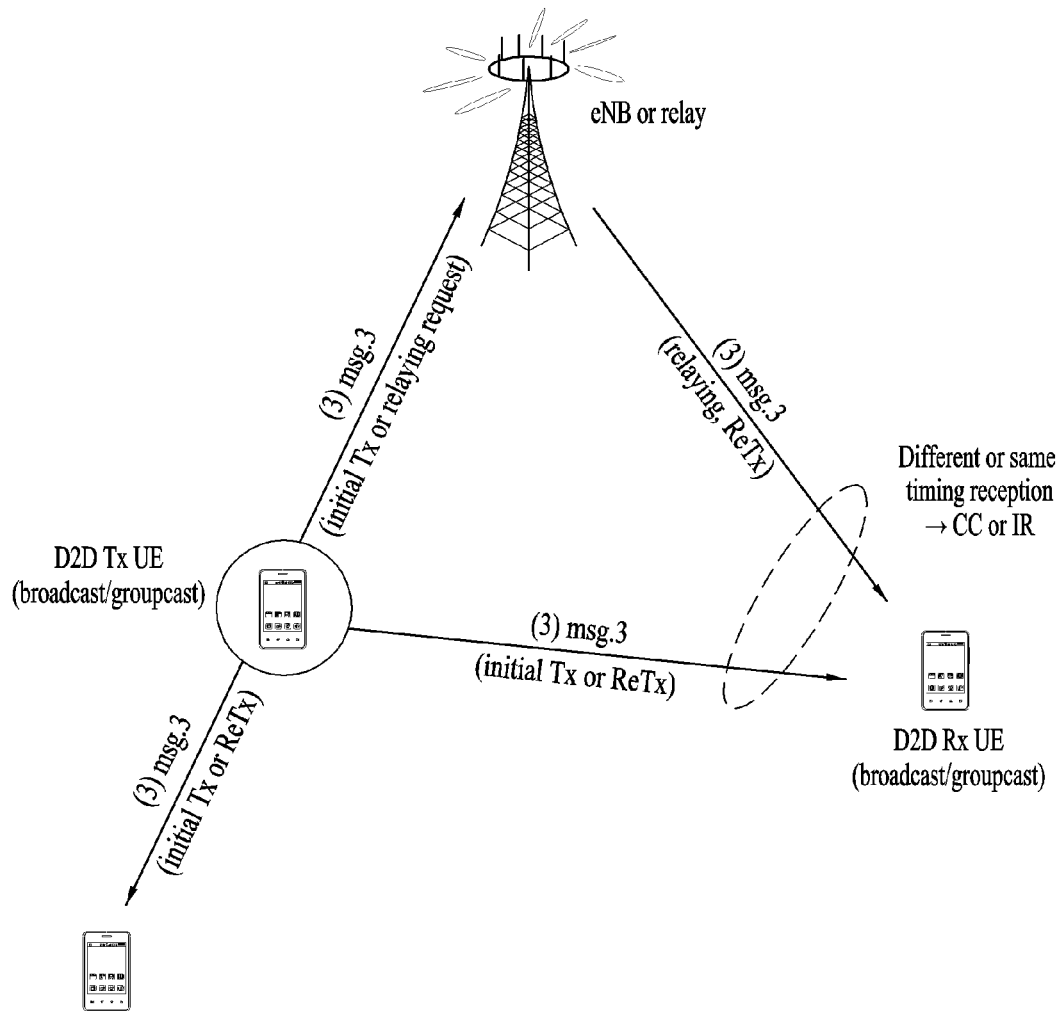
FIG. 12 is a diagram for explaining a method for lowering a coding rate of msg3 according to an aspect of the present invention.

FIG. 12 is a diagram for explaining a method for lowering a coding rate of msg3 according to an aspect of the present invention.

As one method for lowering a coding rate in an Rx UE as described above, a HARQ mechanism may be used so that a Tx UE directly performs repeated transmission of msg3 or a device such as an eNB or a relay receiving msg3 may relay transmission of msg3. That is, the Tx UE may perform retransmission or repeated transmission of msg3, the eNB may perform retransmission or repeated transmission of msg3, both the Tx UE and the eNB may perform retransmission or repeated transmission of msg3. In the example illustrated in FIG. 12, the Rx UE receives msg3 transmitted by the eNB and msg3 transmitted by the Tx UE in combination.

In a situation in which msg3s received from multiple sources should be combined, in FDD, msg3 transmitted by the Tx UE uses a UL band and msg3 relayed by the eNB uses a DL band. Therefore, a msg3 transmission timing by the Tx UE and a msg3 repeated transmission timing by the eNB do not necessarily have to be equal. Significant combining gain may be obtained by combining msg3s transmitted in different bands.

Similarly, even in TDD, it is not necessary for the Tx UE and the eNB to mandatorily perform synchronized transmission or repetition. However, if possible, transmission of msg3 by the Tx UE and the eNB at the same timing may be more efficient in terms of resource consumption.

Figure 13:
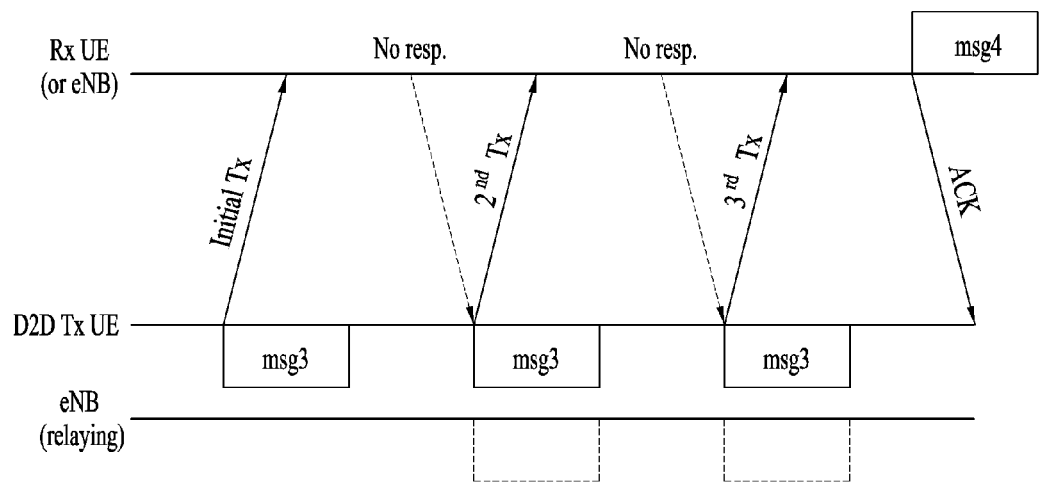
FIGS. 13 to 15 are diagrams for explaining effects of repeated transmission according to an embodiment of the present invention.
Figure 14:
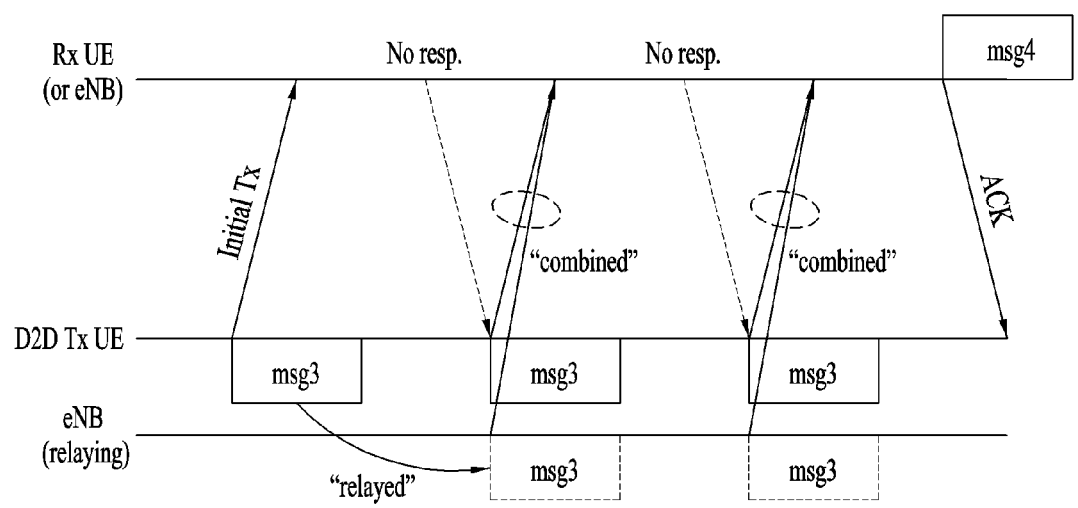
Figure 15:
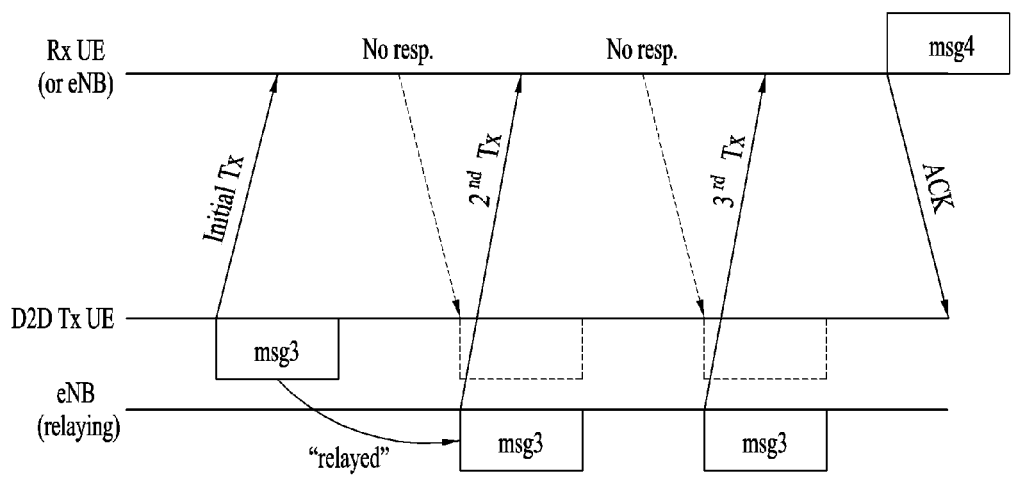

FIGS. 13 to 15 are diagrams for explaining effects of repeated transmission according to an embodiment of the present invention. Specifically, FIGS. 13 to 15 show the case in which msg3 transmitted thirdly is successful after there is no response to msg3 transmitted twice.

In FIG. 13, a D2D Tx UE directly performs repeated transmission of msg3 because there is no relaying service performed by an eNB for example. Such repeated transmission differs from a repeated transmission method, disclosed in another invention by the same inventor, for enabling a plurality of UEs to overhear a paging signal in units of paging groups whenever waking up because the UEs cannot simultaneously receive the paging signal due to characteristics of the paging signal. This is meaningful in that an Rx UE repeatedly receives a signal once or more or from more than one node (the Tx UE, eNB, or relay). Alternatively, if data transmitted through a HARQ procedure has an error, repeated transmission is associated with a HARQ recovery process in which a transmitter transmits the same redundancy version (RV) or different RVs and a receiver combines the RVs to recover the data.

FIG. 13 shows the case in which the eNB does not participate in relayed transmission, FIG. 14 shows the case in which the eNB participates in relaying transmission, and FIG. 15 shows the case in which both the eNB and the Tx UE participate in retransmission.

In FIG. 14, although first msg3 transmitted by the Tx UE and second msg3 transmitted by the eNB are signals transmitted at different timings and in different spaces, decoding performance can be improved by properly combining first msg3 and second msg3. For example, if a receiver uses CC or IR, coding gain can be raised. Accordingly, in the methods illustrated in FIGS. 13 to 15, the probability that the receiver will successfully demodulate msg3 through a proper process (e.g. CC or IR) and buffering management may greatly increase even though msg3s are transmitted at different timings, at the same timing, in the same transmission location, or in different transmission locations.

In the above process, as a method for transmitting msg3 to the eNB by the Tx UE, the Tx UE may directly transmit msg3 using an additional resource and channel or, when the D2D Tx UE broadcasts msg3, the eNB may overhear information about msg3 and involve a decoded value in retransmission. In this case, it is desirable for the eNB to transmit, to the Tx UE, a response signal capable of transmitting a meaning indicating "the eNB has successfully received msg3 and, if an error occurs later, the eNB itself will participate in retransmission" by transmitting special information to the Tx UE. This signal may be implemented through a higher layer signal as well as a physical layer signal.

Figure 16:
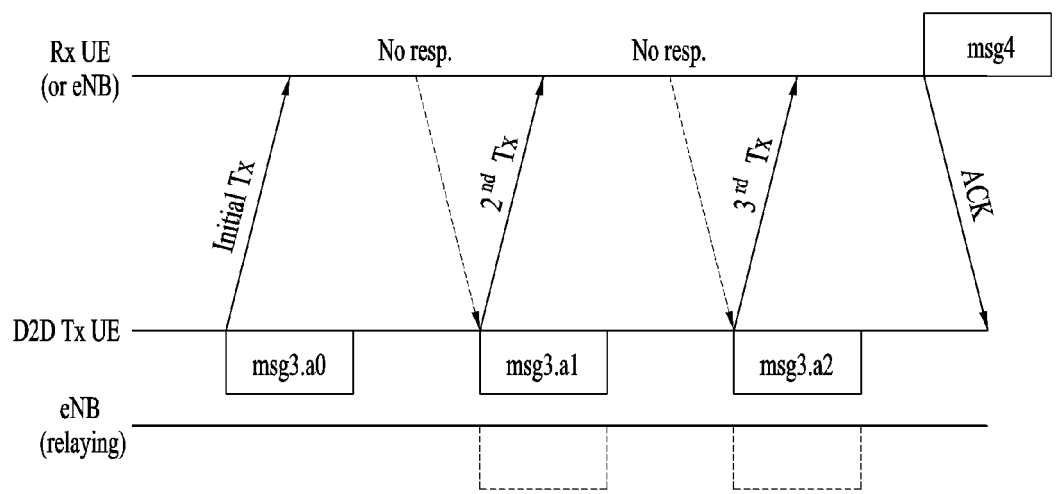
FIGS. 16 to 18 are diagrams for explaining a msg3 combining process by a receiver.
Figure 17:
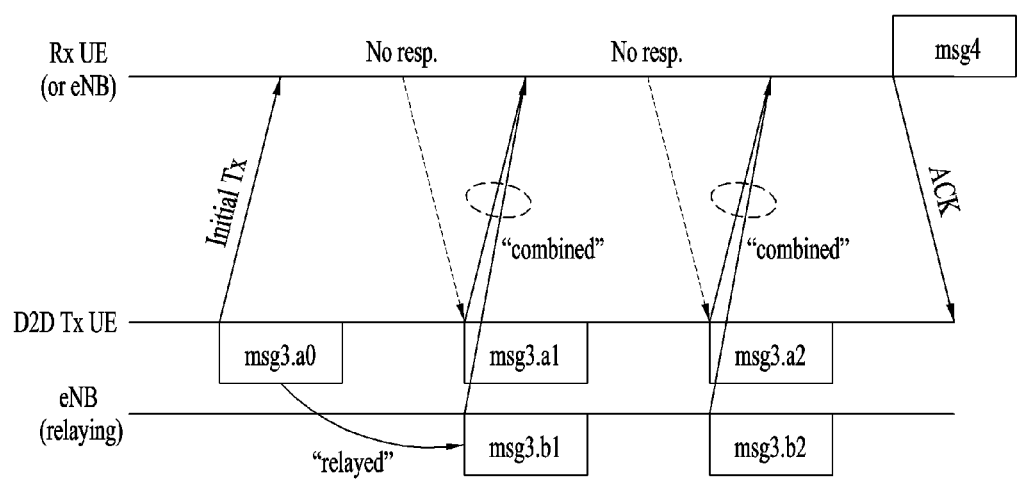
Figure 18:
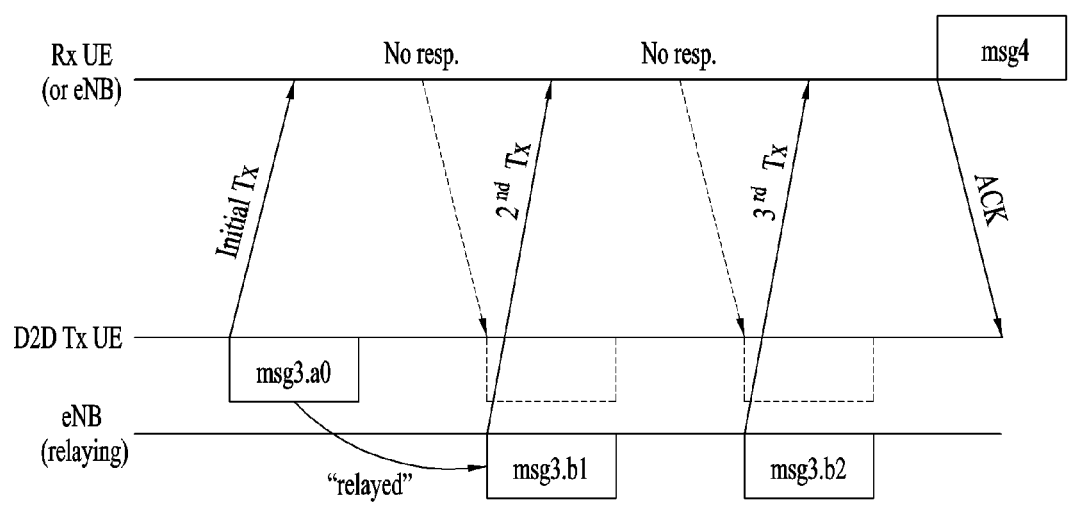

FIGS. 16 to 18 are diagrams for explaining a msg3 combining process by a receiver.

In FIGS. 16 to 18, msg3 which is initially transmitted or retransmitted by the Tx UE is denoted as msg3.ai (where i=0, 1, 2, . . . , N1_repetition) and msg3 which is transmitted by the eNB is denoted as msg3.bi (where i=1, 2, 3, . . . , N2_repetition).

In FIG. 16, since only the Tx UE transmits msg3, the receiver buffers msg3 and performs a CC or IR operation with respect to subsequently arriving msg3, thereby obtaining a proper result value. When the case in which transmission of msg3 is successful after msg3 is transmitted multiple times is considered, the following two operations may be performed.

(M1) CC or IR is performed with respect to currently received msg3a(i) from the Tx UE and previously received msg3.a(i-1) from the Tx UE. The obtained result is used as an input value of CC or IR in the next step.

(M2) CC or IR is performed with respect to all received and stored msg3.ai whenever a new value is received.

In FIG. 17, msg3 is repeatedly received simultaneously from the Tx UE and the eNB. Even in this case, CC or IR may be performed in various forms. The following CC or IR may be performed.

1) CC or IR is performed only with respect to msg3.a series received from the Tx UE by the above-described M1 or M2 scheme and CC or IR is performed only with respect to msg3.b series received from the eNB by the above-described M1 or M2 scheme. Thereafter, CC or IR is performed with respect to the two resultant values (a series and b series).

2) CC or IR is performed with respect to the above-described M1 or M2 scheme in order of received signals regardless of transmission locations.

In FIG. 18, after the Tx UE initially transmits msg3, all retransmissions of msg3 are performed by the eNB.

In this case, CC or IR may be performed with respect to each of msg3.a0, msg3.b1, and msg3.b2 and the above-described M1 or M2 scheme may also be used.

The above schemes assume the case in which all msg3s are received as shown. A specific UE may be designed to receive only part of msg3s. In this case, dropped msg3s are omitted from the above proposed scheme and CC or IR is performed while the next process is performed.

An LTE RACH has been designed such that a UE which has initially transmitted msg1 monitors msg2 and transmits msg3 for msg2. Since a method according to this embodiment uses msg3 to be broadcast to Rx UEs, the Rx UEs neither receive msg1 nor attempt to monitor msg2. Furthermore, the Rx UEs do not know the fact that the Tx UE has transmitted msg3 and will not attempt to monitor and receive msg3. In particular, msg3 is usually transmitted by a UE (??) and the UE should receive msg3 as opposed to other cases (?? the LTE RACH).

Accordingly, a special action is needed in order for the UE to receive msg3. Especially, information necessary to decode and demodulate msg3 is needed. In this way, it is desirable that the Rx UEs receive msg2 serving as a scheduling grant for msg3. That is, it is desirable to transmit, to the Rx UEs, msg2 including information necessary to decode and demodulate msg3 (resource assignment, MCS, HARQ, transmission timing, timing advance, CP length, emergency indicator, hopping indicator, priority indicator, number of msg3 transmissions, retransmission timing, HARQ response method, etc.). In addition, before information about msg2 or decoding and demodulation information is transmitted to the Rx UEs, the Rx UEs need to receive msg2 and it is desirable that the Tx UE inform the Rx UEs of information about a timing at which msg2 is transmitted or msg2 is likely to be transmitted, RNTI related information (if a PDCCH of msg2 is masked with an RNTI, information such as an RA-RNTI for demasking the PDCCH or a range or specific assignment value of an RNTI value reserved for a D2D Tx UE), a Tx UE ID (when necessary), msg1 transmission information of the Tx UE (a time-frequency resource index, a subframe, a radio frame, a UE ID, or an international mobile subscriber identity (IMSI)), and in particular, information used for scrambling and masking msg2.

Alternatively, the Tx UE may preinform the Rx UEs of information about a subframe in which msg2 is transmitted (a fixed or configurable value) through broadcast and the Rx UEs need to decode and demodulate msg3 by continuously monitoring a corresponding subframe or radio frame.

Meanwhile, when msg3 is transmitted to the Rx UEs through relaying, since there is a probability that msg3 is transmitted in the form of msg4, the Rx UEs should continue to perform monitoring at a msg4 transmission timing so as to finally acquire a broadcast message by decoding and demodulating msg4 (having a format including information about msg3 or including the case in which msg3 is transmitted).

Alternatively, if a broadcast signal is transmitted with the same format as msg3, msg4 does not actually exist and this may be considered as retransmission or repeated transmission of msg3.

Next, it is assumed that msg3 has been normally transmitted by receiving msg2. Msg3 may be transmitted to the eNB and the Rx UEs from the Tx UE. Upon receiving msg3, the eNB may transmit msg4 to the Tx UE to indicate whether msg3 has been successfully received. Even in the case of groupcast, upon receiving msg3, the Rx UEs may transmit msg4 (which is a message transmitted by the Rx UEs to the Tx UE and may be identical to, without being limited to, a message transmitted by the eNB to the Tx UE) to the Tx UE to indicate whether msg3 has been successfully received. However, in the case of broadcast, the Rx UEs may omit a process of transmitting msg4. Alternatively, the Rx UE may inform the eNB whether msg4 (? msg3) has been received and the eNB may collect such information and transmit the information to the Tx UE. This is based on the assumption that the eNB may relatively well receive signals of all of the Rx UEs. In this case, the eNB may be a device for making a final decision as to whether msg3 has been received. Even when msg3 is not properly transmitted, the eNB may cause the Tx UE to re-attempt to transmit msg3 by scheduling msg2 again.

As another issue, there may be the case in which no response to transmission of msg3 is performed and this issue will now be analyzed. The case in which no response is performed, that is, the case in which the Tx UE cannot receive msg4 may be broadly classified into the case in which msg4 transmitted by the eNB cannot decode a PDCCH and the case in which a PDSCH cannot be decoded and demodulated.

(1) In the Case of PDCCH Error (PDCCH Detection Failure)

This case corresponds to non-detection of a msg4 PDCCH despite monitoring the PDCCH for msg4. This case occurs when msg3 is not received and may be divided into the case in which msg3 is not properly received due to msg3 collision (one or more Tx UEs transmit msg1 and simultaneously receive responses to msg2 and the respective Tx UEs transmit msg3) and the case in which msg3 is not properly received due to a poor msg3 transmission radio channel. A simple solution method is to resume a procedure starting from transmission of msg1 because a D2D broadcast procedure has failed. It is apparent that previously received parameters and setting values for the parameters may be reused.

Alternatively, parameters may be enforced to a predetermined level and then used. For example, transmit power of msg1 may be raised to a higher power level and then transmission of msg1 may be restarted. Alternatively, if transmission of msg1 is successful, scheduling may be attempted by setting a TPC command for a msg2 scheduling grant to a higher value.

Alternatively, when there is no msg4 response, msg1 may be skipped and msg2 may be monitored in subframe(s) scheduled to transmit msg2 (or scheduled subframe(s) to be known in this situation) to re-receive a msg3 scheduling grant.

Meanwhile, a method for eliminating msg4 and simply broadcasting msg3 and then completing a procedure may be used. Although msg4 is designed to be used for a HARQ operation for msg3 and RRC connection completion or confirmation, a response may not be needed especially when broadcast is performed in D2D communication. Accordingly, msg4 may not be needed. In particular, in the case of outside network coverage, an operation without msg4 may be sufficiently performed.

(2) PDSCH Error Situation (PDSCH Demodulation Failure)

Successful detection of a msg4 PDCCH means that msg3 has been normally received in an immediately previous procedure. Therefore, an eNB or Rx UE might have transmitted the msg4 PDCCH. However, demodulation of a PDSCH may be impossible if an error occurs in a PDSCH. This case is similar to an error occurrence situation in a so-called HARQ operation and, generally, NACK will be transmitted in a normal HARQ operation. However, in D2D broadcast, it may be unnecessary to retransmit msg3 as opposed to a conventional RACH procedure. If a Tx UE desires to retransmit msg3, the Tx UE may use a method for performing retransmission by transmitting a scheduling grant for retransmission through msg2 or a method for autonomously retransmitting msg3 using predesignated scheduling grant information.

Even when two or more Tx UEs transmit msg3, one of msg3s transmitted by the Tx UEs may be detected by the eNB and may be successfully demodulated. In this case, a msg4 response may be transmitted to a Tx UE that has successfully transmitted msg3. Then, the eNB which has successfully received msg3 may respond to msg3 by transmitting msg4 indicating whether a broadcast message has been successfully received to the successful Tx UE. Then, the Tx UE ends a broadcast message transmission process. However, if a Tx UE has received the msg4 response and the msg4 response is not for the Tx UE, it is desirable the Tx UE return to a msg1 transmission procedure to resume the broadcast message transmission process. This is because even the eNB is not aware of which Tx UE has transmitted a broadcast message and, therefore, the eNB cannot generate a msg2 scheduling grant for msg3. This contention resolution procedure is currently performed using RACH msg4. In this case, if a Tx UE judges that there is no ID thereof after receiving msg4, the Tx UE performs a msg1 transmission process again.

Figure 19:
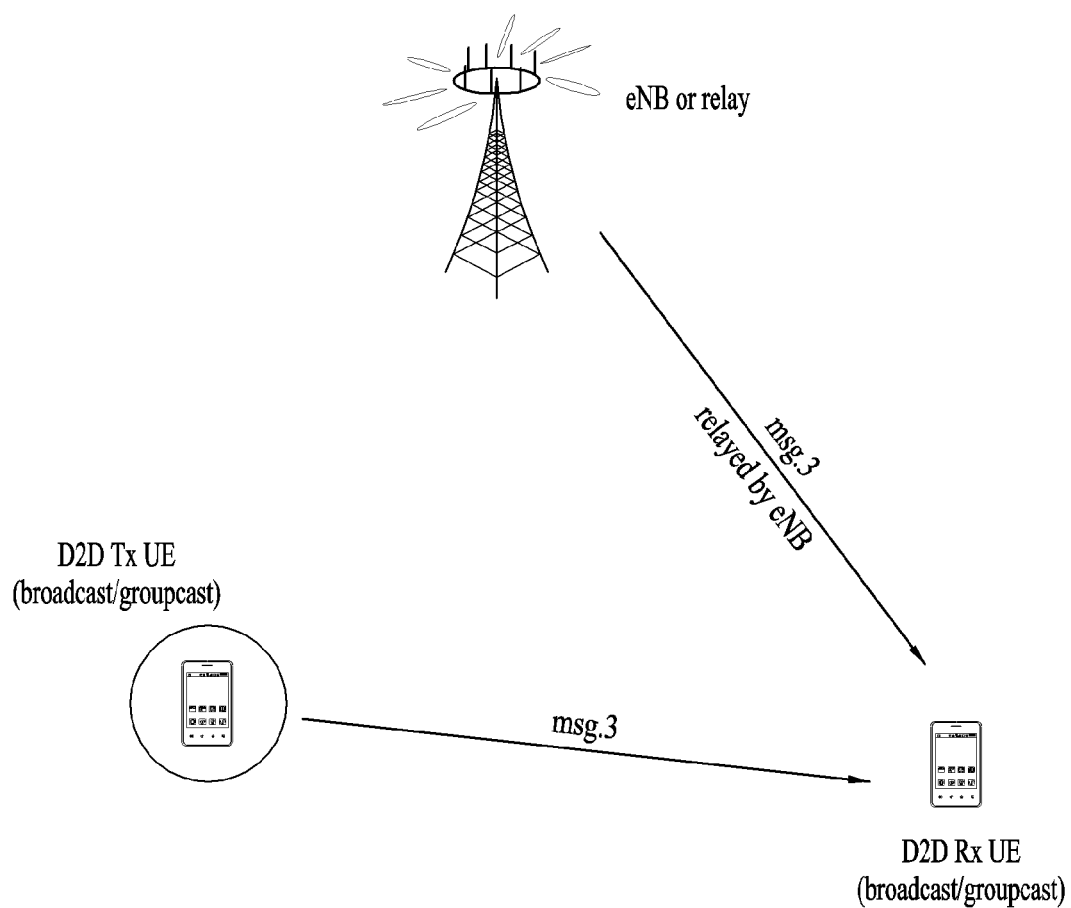
FIG. 19 is a diagram for explaining a reception operation procedure of an Rx UE when an eNB serves to relay msg3.

FIG. 19 is a diagram for explaining a reception operation procedure of an Rx UE when an eNB serves to relay msg3.

Relayed msg3 may correspond to Step 4 (msg4) in, for example, an RACH procedure. However, since the contents of msg4 are about msg3, msg4 is expressed as relayed msg3 in FIG. 19.

A D2D Rx UE has a probability of not only receiving D2D broadcast but also continuing to maintain connection with an eNB. Therefore, the Rx UE may receive a PDSCH scheduled through a PDCCH/EPDCCH from the eNB. In this case, the Rx UE should determine whether to receive D2D broadcast msg3 (relayed or non-relayed msg3) or a normal PDSCH received from the eNB.

If the Rx UE has reception capabilities, the Rx UE may receive and process both D2D broadcast msg3 and the PDSCH. However, if it is judged that the Rx UE should receive one of D2D broadcast msg3 and the PDSCH (especially, on the same carrier, band, or spectrum), it is desirable to receive relayed D2D broadcast msg3. When considering the fact that a broadcast message is an emergency signal, it is desirable to prioritize reception on a D2D link.

However, in a situation in which carrier 1 maintains communication between the eNB and the UE and carrier 2 maintains D2D communication when a plurality of carriers is present, if relayed D2D broadcast msg3 is transmitted to carrier 2, the Rx UE desirably receives relayed D2D broadcast msg3 and simultaneously receives a PDSCH scheduled at the same time on carrier 1.

A conventional RACH operation is as follows.

In an LTE RACH operation, if an RA-RNTI and a C-RNTI or a semi-persistent scheduling (SPS)-RNTI are allocated in the same subframe and a UE is not configured by a plurality of timing advance groups, the UE does not need to decode a PDSCH indicated by a PDCCH having a CRC scrambled by the C-RNTI or the SPS-RNTI.

TABLE 2

| DCI format | Search Space | Transmission scheme of PDSCH corresponding to PDCCH |
|---|---|---|
| DCI format 1C | Common | If the number of PBCH antenna ports is one, Single-antenna port, port 0 is used (see subclause 7.1.1), otherwise Transmit diversity (see subclause 7.1.2) |
| DCI format 1A | Common | If the number of PBCH antenna ports is one, Single-antenna port, port 0 is used (see subclause 7.1.1), otherwise Transmit diversity (see subclause 7.1.2) |

Assuming that the RA-RNTI is used for D2D broadcast as opposed to a conventional scheme, even if a C-RNTI or an SPS C-RNTI is detected together with the RA-RNTI in a specific subframe, only the RA-RNTI may be decoded and the C-RNTI or the SPS C-RNTI may not be detected. That is, an operation in which detection of the C-RNTI or the SPS C-RNTI is not expected should be added.

If a new RNTI such as a D2D RNTI rather than the RA-RNTI is introduced used for D2D broadcast to perform broadcast and groupcast, an assumption that there is no PDSCH scheduled to the C-RNTI or SPS C-RNTI other than the D2D RNTI may be mandatorily made.

When considering the fact that relayed msg3 has no constraint on decoding time, an operation for receiving and storing relayed msg3 and decoding relayed msg3 as needed may be performed. For example, the D2D RNTI may be received at the same time with the C-RNTI or the SPS C-RNTI so that sequential decoding may be performed according to urgency or priority.

Although the above description has been given focusing on msg4, priority should be assigned to a D2D link in terms of a D2D Tx UE receiving msg2 (a broadcast msg3 scheduling grant) in a D2D operation and, therefore, the D2D Tx UE should first receive a link on which D2D msg2 is transmitted, such as a D2D RA-RNTI or a new D2D RNTI. That is, it may not be expected that there is a PDSCH scheduled to the C-RNTI or the SPS C-RNTI in the same subframe.

Although the above description has mainly mentioned D2D broadcast, the proposed technique may be applied to unicast as well as groupcast.

In Case of Groupcast

An embodiment of the present invention additionally proposes performing HARQ ACK/NACK design for groupcast. Especially, a groupcast UE may manage members of a group through HARQ ACK/NACK for transmission msg3 as opposed to a broadcast UE.

Therefore, in the case of groupcast, msg4 is desirably transmitted to a Tx UE. However, if there is a device that can replace retransmission of the Tx UE, msg4 may be transmitted to the device so that a retransmission packet may be received without being transmitted to the Tx UE. For example, an eNB may replace such a role. Alternatively, other adjacent relay UEs may perform retransmission. If there is no relay device, it is desirable to transmit msg4 to the Tx UE.

A process for transmitting a message to the Tx UE may include a direct transmission method and an indirect transmission method. It may be possible to indirectly inform the Tx UE whether a received message contains an error or whether retransmission is needed through the eNB or other D2D UEs.

Meanwhile, in the case of broadcast, it is more desirable not to feed back a message indicating whether a received message contains an error. Because a message is transmitted to a plurality of unspecified entities, it is not always necessary for a transmitter to be aware of the fact that some of the entities have not properly received the message.

In more detail, if Rx UEs have successfully received msg3, an eNB does not need to transmit relayed msg3. If some of the Rx UEs have failed to receive msg3, it may be helpful for the eNB to transmit relayed msg3. For retransmission, the eNB requires pre-knowledge. Such information may be acquired from the Tx UE or the eNB may directly receive the information from the Rx UE to determine whether to perform retransmission. For example, if the Tx UE transmits msg3, some Rx UEs may successfully receive msg3 and the others may fail to receive msg3. The Rx UEs failing to receive msg3 will directly transmit msg4 to the Tx UE to indicate whether msg3 has been successfully received or not. Alternatively, if the Rx UEs know the presence of the eNB and the fact that the eNB will participate in retransmission through relaying, the Rx UEs will transmit msg4 to the eNB. Msg4 transmitted from the Rx UEs may actually correspond to HARQ ACK/NACK information and is a reference for indicating a reception state of msg3 information in a group.

If only the Tx UE overhears msg4 ACK/NACK, a signaling process of informing the eNB of msg4 ACK/NACK is needed. If there is a connection between the eNB and the Tx UE, the signaling process may be performed through higher layer signaling or through MAC or physical signaling.

However, the eNB should endure latency to some degree. Since such latency may greatly affect system efficiency in some cases, it is possible for the eNB to directly receive msg4 ACK/NACK from the Rx UE in order to reduce latency. Then, the eNB may use msg4 ACK/NACK to determine whether retransmission should be performed or to determine a retransmission scheme based on statistics of received ACK/NACK or individual ACK/NACK feedback information.

In the case of individually controlling UEs, the eNB may attempt to perform retransmission with respect to individual UEs and take one response with respect to a group of UEs. An operation in the latter case is as follows. If statistics of ACK/NACK of the group of UEs show that more than P_AN % is ACK, the eNB does not perform retransmission under the assumption that all of the UEs have received a message and attempts to perform next transmission. In contrast, if statistics of ACK/NACK show that less than P_AN % are ACK, a specific threshold value may be introduced so that the eNB attempts to perform retransmission again. Alternatively, only UEs that have failed to receive a message may transmit NACK so that the eNB may receive NACK through SFN combination. Thus, how many UEs have failed to receive msg3 may be estimated based on strength or energy of NACK signals and the eNB may determine whether to perform retransmission and determine a retransmission scheme based on the estimated result.

Figure 20:
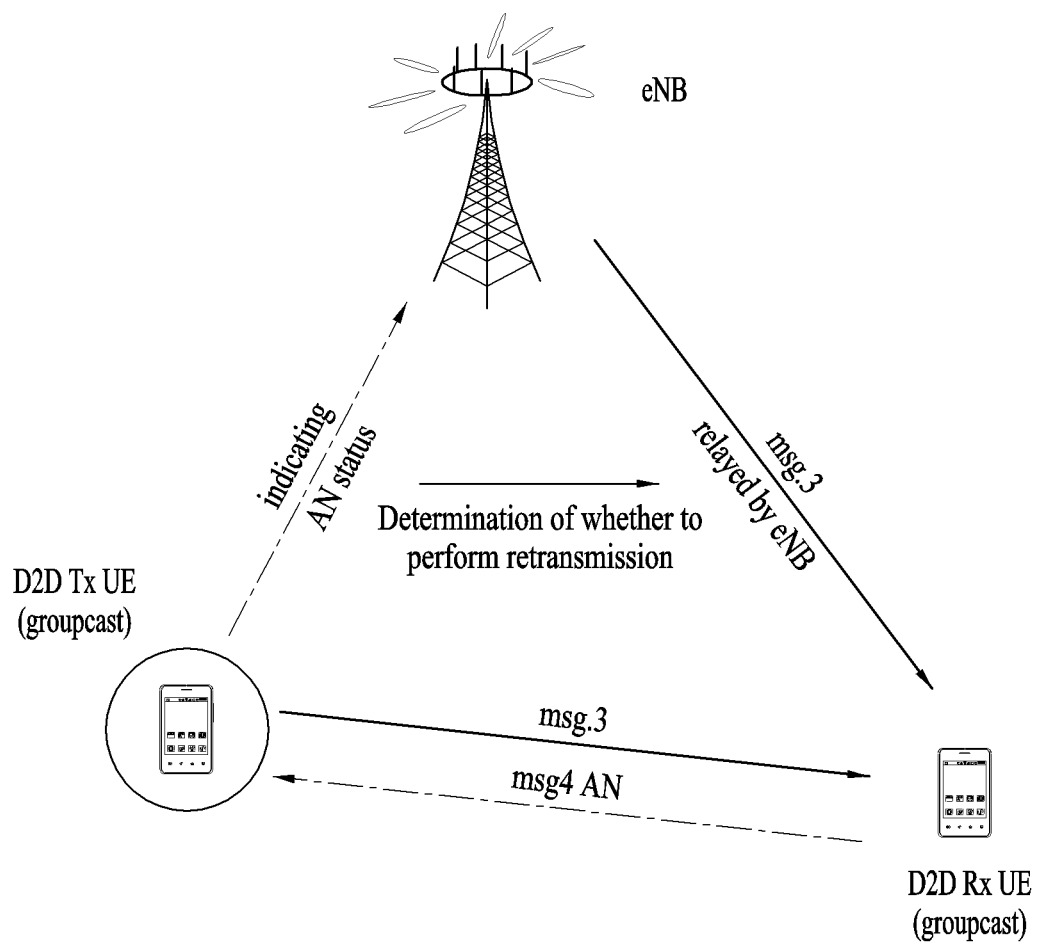
FIG. 20 illustrates a scheme in which a Tx UE receives feedback for msg3 reception success or failure through msg4 from an Rx UE and informs an eNB of a msg3 reception result.

FIG. 20 illustrates a scheme in which a Tx UE receives feedback for msg3 reception success or failure through msg4 from an Rx UE and informs an eNB of a msg3 reception result.

In this case, the eNB may autonomously determine whether to retransmit msg3 based on msg4 received from an Rx UE and may retransmit msg3 according to the determined result.

Figure 21:
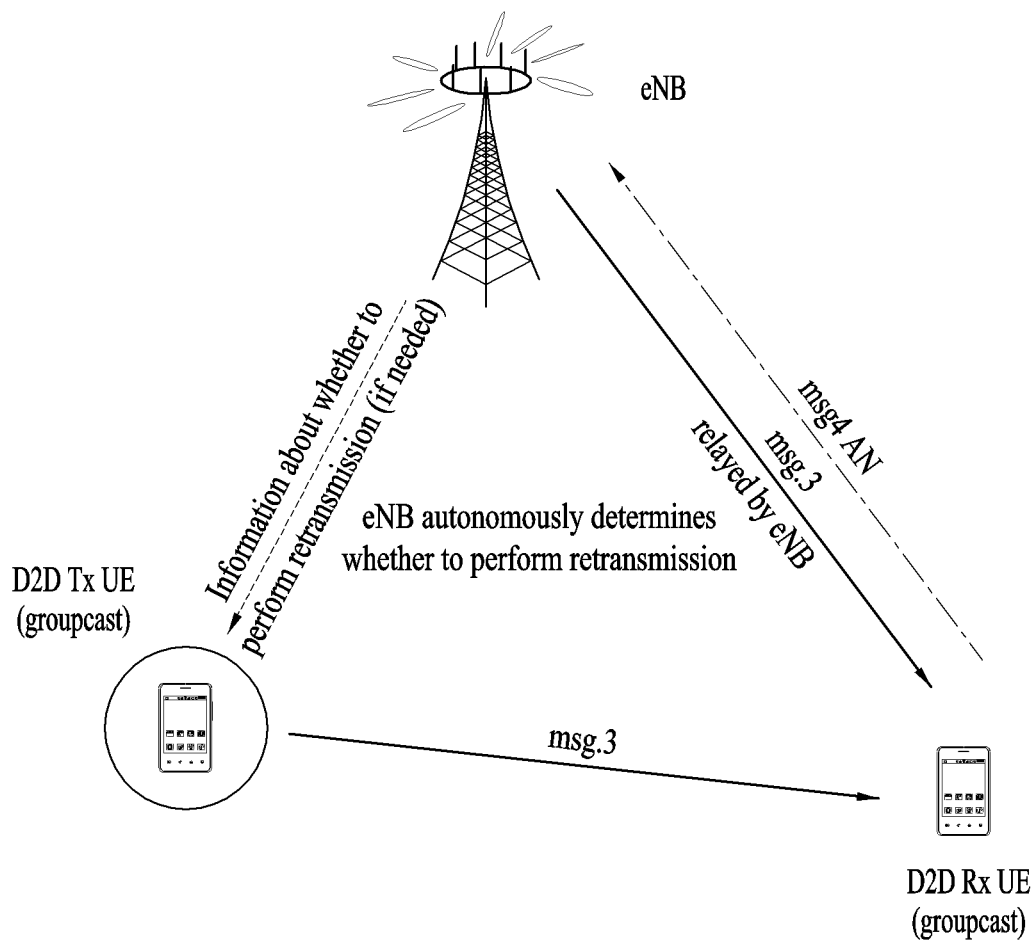
FIG. 21 illustrates a scheme in which an eNB directly receives feedback for msg3 reception success or failure through msg4 from an Rx UE.

FIG. 21 illustrates a scheme in which an eNB directly receives feedback for msg3 reception success or failure through msg4 from an Rx UE.

In this case, the eNB may autonomously determine whether to retransmit msg3 based on msg4 received from the Rx UE and retransmit msg3 to the Rx UE.

In this case, if feedback information is transmitted to the eNB, a PUCCH may be basically used as an ACK/NACK resource. However, in consideration of PUSCH transmission of a Uu link, if a simultaneous transmission situation occurs, a scheme for piggybacking a PUSCH may be used. The PUCCH resource may be allocated to an additional PUCCH resource region and then managed. Individual PUCCH resource assignment may be dynamically selected in linkage with a msg3 transmission resource. A starting position of the resource region may be predesignated by offering N_pucch_offset and may be newly determined in every subframe in linkage with a msg3 transmission resource location, etc. (a resource block (RB) index, RB and subframe indexes, a UE ID and RB and subframe indexes, etc.) within the region (e.g., the same scheme as PDCCH CCE-to-PUCCH index linkage).

Alternatively, the starting position of the resource region may be determined in linkage with a msg2 group RNTI and/or an RAR index.

Figure 22:
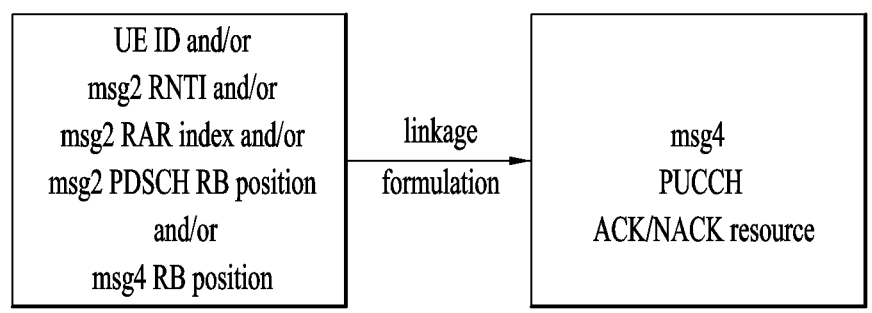
FIG. 22 is a diagram for explaining a concept for determining a msg4 transmission resource in linkage to various transmissions according to an example of the present invention.

FIG. 22 is a diagram for explaining concept for determining a msg4 transmission resource in linkage with various transmissions according to an example of the present invention.

That is, a resource on which ACK/NACK is to be transmitted through a msg4 PUCCH may be determined by being mapped to an UE ID, a msg2 RNTI, a msg2 RAR index, a msg2 PDSCH RB position, and/or a msg4 RB location. In this case, individual resource assignment for msg4 transmission may be omitted.

As described above, the proposed methods may be applied to an RRC idle UE as well as to an RRC connected UE. This is because the RRC idle UE should also be capable of participating in transmission and reception of a D2D broadcast signal in consideration of an emergency situation.

Since transmitting, for example, broadcasting information by the idle UE without establishing RRC connection is not possible according to current standards, the idle UE cannot perform broadcast unless the idle UE generates an additional D2D mode and performs broadcast in the additional D2D mode. Therefore, an RACH procedure is prerequisite to RRC connection which is needed for the idle UE to perform broadcast according to the current standards.

In this sense, if the idle UE can transmit a broadcast signal in the middle of the RACH procedure even without accomplishing RRC connection, there is an advantage in terms of latency. Accordingly, an example of the present invention proposes a method in which the idle UE is capable of performing broadcast even prior to completion of an RRC connection procedure using a pseudo RACH procedure. As a simple example, it is proposed that msg3 be set to be used for transmission of a broadcast signal immediately after a Tx UE transmits msg1 and receives msg2 from an eNB.

Hereinafter, all of the procedures of FIGS. 6 to 10 may be used for a procedure for performing broadcast by the idle UE unless mentioned otherwise.

For reasons of an emergency situation etc. or for groupcast for group communication, a D2D Tx UE having content to be broadcast/groupcast may transmit msg1 to an eNB. Msg1 may be regarded as a signal demanding scheduling information necessary to transmit a broadcast signal and may differ in purpose/sequence configuration from a conventional preamble. In addition, the eNB may include an additional sequence, resource, pattern, etc. to distinguish between msg1 and the preamble.

In another example, msg2 may mean only a grant for a resource request in msg1. For example, if a broadcast transmission resource, time, frequency, etc, are preconfigured or can be implicitly known (if they differ according to msg1 information or they are known through a UE ID, a preamble index, a transmission resource location/index, or a combination thereof), reception of msg2 after transmission of msg1 corresponds to receiving only a grant from the eNB. Then, Rx UEs will receive a broadcast signal preconfigured or implicitly known time and frequency resource locations (in this case, time advance information as well as a subframe and a radio subframe may be considered as a time resource).

As an example of implicit information for msg3, an emergency or special purpose broadcast signal may always be transmitted on specific time and frequency resources. Accordingly, if any signal is detected on the corresponding resources, the eNB may regard the signal as the emergency or special purpose broadcast signal and take an action according to the detected signal.

In another example of the present invention, msg2 may be set to carry scheduling information necessary for transmission of msg3 using msg2 as opposed to the above case in which msg2 is a simple grant for a msg1 request. Meanwhile, if idle UEs do not know when to overhear msg3, a wakeup procedure such as paging may be introduced to inform the idle UEs of an overhearing timing. The D2D idle UEs are informed of a broadcast signal monitoring occasion, a subframe, and a radio frame through paging. That is, information as to when the idle UEs should wake up and overhear msg3 may be indicated.

The information should be indicated to all UEs before msg3 is transmitted. This may be recognized as another additional paging different from conventional paging.

Although paging has determined when a UE should wake up and perform monitoring through a UE ID and a higher layer parameter, new paging according to the present embodiment may introduce a paging signal causing all UEs to monitor a specific resource at a specific timing, for a D2D Rx UE that should overhear msg2. In order to minimize variations of a conventional paging operation, paging may be identically performed but msg2 may be transmitted multiple times so that D2D Rx UEs that wake up at different timings may overhear msg2 without missing msg2. As a result, all Rx UEs may have an opportunity to overhear msg3 at least once. It is desirable that a cycle at which the same contents of a message are transmitted multiple times be set such that a basic D2D Rx UE that should overhear the contents may wake up at least once and overhear msg2. An accurate cycle may be differently set according to msg2 detection capability.

As an associated operation, msg3 may be transmitted whenever msg2 is transmitted. This operation may be implemented such that msg3 is transmitted after a predetermined timing after msg2 is transmitted. Alternatively, after msg2 is transmitted multiple times, msg3 may be transmitted once. In this case, msg2 and msg3 do not need to be in one-to-one correspondence and may be implemented in the form of multi-to-one correspondence. A timing relationship may be variously set including t>0. The timing relationship may be set in association with a UE paging operation.

It is necessary to assign higher priority to a reception operation of msg3 than a reception operation of other signals. If msg3 is an emergency signal and a broadcast signal, msg3 needs to be more prioritized than transmission and reception of other signals due to urgency of msg3. If UL transmission should be performed in a subframe in which msg3 should be received, a corresponding channel may be skipped/dropped/delayed in UE-to-eNB transmission.

When an eNB transmits a signal to a D2D UE at a corresponding timing, it is desirable to stop a transmission operation of the signal because reception of msg3 is prioritized. Even in this case, a related transmission channel operation (e.g., HARQ) may be skipped or delayed. This operation may be performed in one or more subframes (multiple subframes), in a subframe group (or set), or in a subframe group (or set) or subframe based cycle unit having an irregular cycle pattern.

Now, msg2 will be described again. Basic transmission information of msg2 may include timing advance (TA), time/frequency allocation, and power ramping information. The TA information may be useful when a broadcast Rx UE estimates an approximate reception timing. For example, if a UE having TA of a very large value is a broadcast Tx UE and the Rx UE receives only subframe information without considering the TA and attempts to perform reception based on a TA thereof or TA=0, the Rx UE may not totally receive a broadcast signal due to timing mis-alignment. Therefore, as the TA increases, importance of the TA will further increase.

In this aspect, it is desirable to introduce a mechanism for informing all Rx UEs of a TA value of the Tx UE. The Rx UEs may receive the TA value included in msg2 and use the TA value to receive the broadcast signal. That is, the Tx UE transmits TA as a compensated/considered value and the Rx UEs receive the value.

When necessary, CP length may be indicated so that the Tx/Rx UE may use the CP length. As an example, when a broadcast signal transmission resource is fixed to a known value or an RA-RNTI is determined using RA_RNTI=1+t_id+10*f_id even in D2D communication, if UEs to be broadcast/groupcast share t_id and f_id, the UEs may decode msg2 using the same RA_RNTI. In this case, t_id denotes an index of the first subframe of a specific PRACH (0≤t_id<10) and f_id denotes an index of the specific PRACH within the corresponding subframe in descending order of frequency domain (0≤f_id<6).

As another example, the RA-RNTI may be determined in another form in D2D communication. In fact, since the contents of msg2 are transmitted over a PDSCH, it is not difficult to design msg2 so as to include information necessary for or helpful for reception of a D2D broadcast signal. Basically, information as to when the broadcast signal will be transmitted and information about a resource region on which the broadcast signal will be transmitted may be needed. As described earlier, since UEs differ in a paging occasion (PO) and a paging frame (PF), if the broadcast signal is transmitted only once, there is a problem in that all idle UEs cannot simultaneously overhear the information. Therefore, it is necessary to transmit the same contents of msg2 N times during a specific time duration T so that all Rx UEs can overhear msg2.

In this case, even if the contents of msg2 are the same, encapsulation may be differently set during transmission. The fact that UEs that do not transmit msg1 should receive msg2 is different from a conventional operation. To this end, additional requirements may be needed.

In the case of groupcast, all group UEs may be demanded to receive msg2. The Tx UE transmits a broadcast signal on a prescheduled time/frequency resource (known to all of the Rx UEs) under the assumption that the Rx UEs have obtained information necessary for broadcast reception from msg2. Meanwhile, if msg1 is transmitted in a transmission region configured with t_id and f_id, since there are one or more RA_RNTIs to receive msg2, a UE attempts to receive msg2 with one RA_RNTI matching t_id and f_id in conventional standard technology.

In the case in which a plurality of t_ids and f_ids are present and msg1 is transmitted in a plurality of msg1 transmission regions (values specially reserved for msg1 for the broadcast signal), a method is proposed for successfully receiving msg2 by a UE by attempting to perform blind decoding with respect to a plurality of RA_RNTIs even if msg2 is transmitted with respect to the RA-RNTIs. This method can raise flexibility of msg1 transmission by ensuring a plurality of resource regions in which msg1 can be transmitted. However, too many t_ids and f_ids may generate too many RA_RNTIs, thereby increasing ID values that the UE should monitor and increasing complexity. To properly manage t_ids and f_ids, it is desirable that limited numbers of t_ids and f_ids be used. For example, if there are a few t_ids and f_ids, it is judged that complexity will not greatly increase when the UE performs blind decoding.

To simplify this method, all specific t_id and f_id values may be set to have the same RA-RNTI. In other words, even when a transmission location is changed, if the location has been mapped to one RA-RNTI in a preconfigured specific resource region, an RAR message (msg2) may be obtained using one RA-RNTI.

If the above operation is applied to an RRC connected UE, a part of the operation may be improved. Although the operation is applied to the RRC connected UE, the operation may be configured as if the operation is applied to an idle UE. In this case, an effect of defining a new operation is obtained.

If a Tx UE is in a connected mode, a PRACH procedure need not be performed. It may be assumed that at least DL synchronization and TA have been tracked to some degree.

In this case, a broadcast request may be performed using a signal other than msg1.

The most basic method is to transmit a scheduling request (SR). This signal may be regarded as msg1 for the idle UE with respect to the RRC connected UE. To satisfy a condition that all Rx UEs should overhear msg2, msg2 is desirably transmitted to a common search space like an RA-RNTI. In this case, a special SR resource and a broadcast-RNTI corresponding to the special SR resource are needed. Since characteristics of an SR resource are determined by a cyclic shift (CS) index and an orthogonal cover sequence (OCS) index, a specific index combination may be used for the special SR resource.

Alternatively, the above-described SR resource may be configured by a higher layer signal. All resources which are being used for an SR may be the configurable resource. Alternatively, a specific RB may be set as an RB for transmitting only a broadcast-SR or a specific index range may be set as an index for transmitting the broadcast-SR. In addition, an index combination of a symbol corresponding to spreading factor (SF)=3 and a symbol corresponding to SF=4 may use only 36 SR resources due to restriction of SF=3 in the case of a normal CP and DELTA=1. This corresponds to a result of not using 12 SR resources among 48 SR resources in the case of SF=4. The 12 SR resources may be defined as resources for transmission of the broadcast-SR in the above example and then used.

Thanks to the specially determined SR resources, an eNB may generate a special RNTI and transmit the RNTI so that all Rx UEs can detect the RNTI. When the special RNTI is used, it is desirable that the Rx UEs recognize the RNTI. Monitoring the special RNTI in every subframe may become a burden to a UE. Alternatively, D2D UEs may monitor only the special RNTI in every subframe. This should be performed only within a range of not increasing blind decoding (BD).

Timing Relationship Between Msg2 and Msg3

Figure 23:
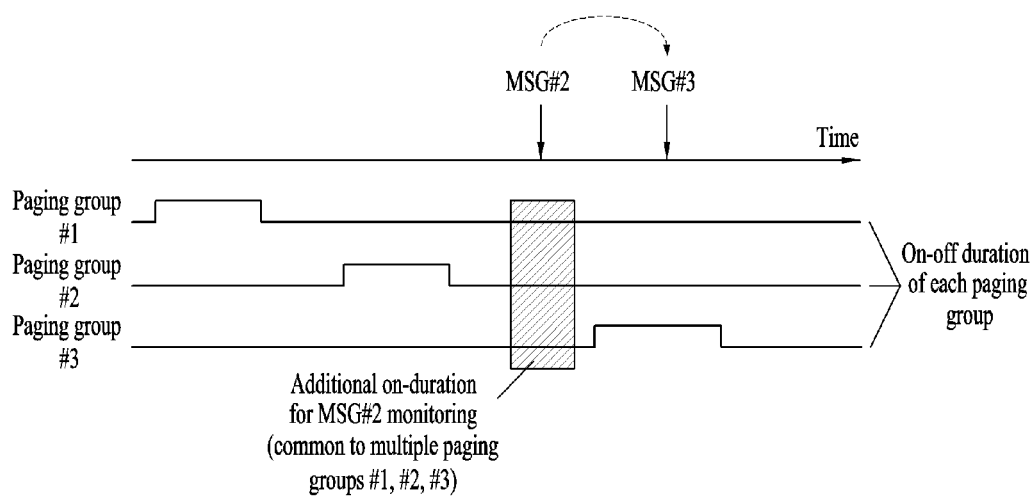
FIGS. 23 to 25 illustrate a relationship between transmission timings of msg2 and msg3 according to each embodiment of the present invention.

FIG. 23 illustrates a transmission timing relationship between msg2 and msg3 considering a paging group, for explaining an embodiment of the present invention. In the example of FIG. 23, it is assumed that there are three different paging groups and the paging groups have on/off-durations at different timings.

As one method for causing all Rx UEs to receive msg2 in the above situation, all paging groups of D2D Rx UEs may have separate on-durations. In this case, there is an advantage of transmitting necessary msg2 information only by transmitting msg2 once. Next, among UEs that have received the msg2 information, a Tx UE will transmit (broadcast) msg3 at a designated timing on a designated resource as indicated by msg2 and the other Rx UEs will receive msg3 at the designated timing on the designated resource as indicated by msg2.

In this method, signaling for generating an additional duration is desirably defined to overhear msg2. In addition, although a duration after reception of msg2 up to broadcast or reception msg3 may be set to again return to sleep/idle mode (from DRX), if a reception timing of msg2 is associated with a transmission timing of msg3 (e.g., transmission is performed when there are available resources after a designated timing) and if the duration is sufficiently short, the duration may be maintained at an on-state. This is because a UE may use the duration between msg2 and msg3 as a time for msg3 broadcast preparation or reception preparation, that is, as a time for sufficiently maintaining time and frequency synchronization.

Furthermore, when the operation illustrated in FIG. 9 is performed, since the Rx UEs need to receive msg4 from the eNB, idle UEs that have received msg2 needs to be changed to an on-state at least before a msg3 transmission timing or before a msg4 transmission timing so that the idle UEs may be ready to receive a corresponding signal. Upon failing to receive msg2, the UEs may return to a normal operation and omit all reception operations during an off-duration, thereby preventing battery consumption.

Figure 24:
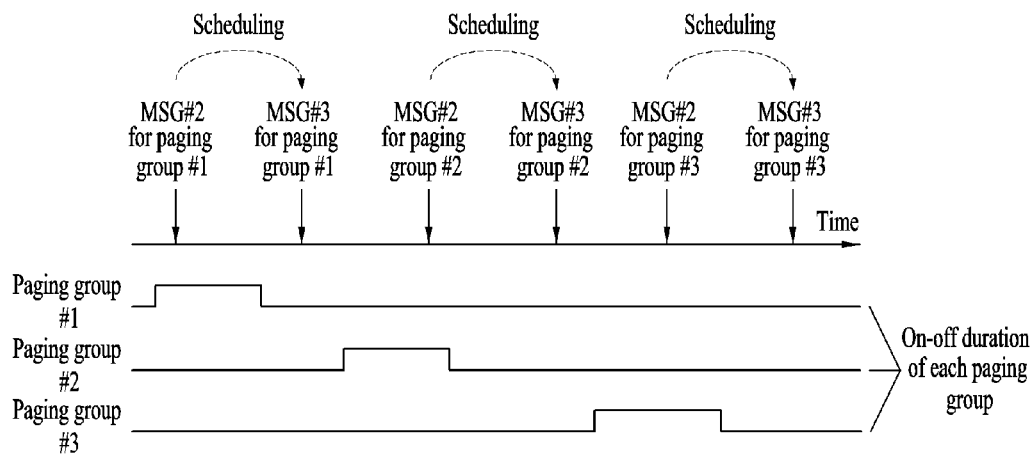

FIG. 24 illustrates an example of transmitting msg2 during an on-duration of each paging group of UEs and then transmitting msg3 at a designated timing by scheduling according to another embodiment of the present invention.

The basic assumption and scheme described with reference to FIG. 23 are identically applied to the example of FIG. 24. However, FIG. 24 is vastly different from FIG. 23 in that msg2 is transmitted multiple times during an on-duration of a paging group. A msg3 transmission timing is determined by scheduling and a sleep mode or a wake-up mode are possible during this timing. In addition, the msg3 transmission timing may be predesignated by a rule as mentioned above (e.g. msg3 is transmitted after k hours) or may be designated according to a scheduling timing/situation. Alternatively, a timer may be activated to transmit msg3 within a predetermined time.

Figure 25:
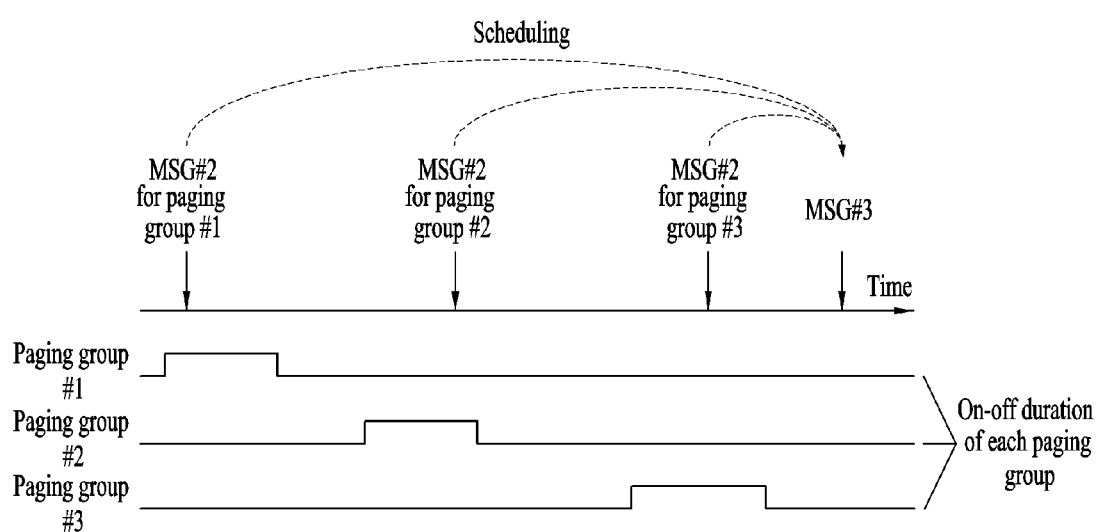

FIG. 25 is a diagram for explaining a timing relationship between msg2 and msg3 according to another embodiment of the present invention.

FIG. 25 is different from the above-described examples in that msg2 is individually transmitted during an on-duration of a paging group but msg3 is transmitted at an appropriate timing after all paging groups receive msg2. In the present embodiment, since a msg3 transmission timing is most important, the msg3 transmission timing should be properly determined. For example, after msg2 is transmitted during an on-duration of the last paging group, msg3 may be transmitted or received after a predetermined time. Similarly, all of the above-mentioned schemes may be applied.

Even in this case, an additional indication should be provided so that both a Tx UE and an Rx UE can overhear msg3 at a msg3 transmission timing. To this end, a scheduling node (an eNB or cluster head) may inform the UEs of a msg3 transmission/reception timing or of the last msg2 transmission timing.

In FIG. 25, in the case of paging group #1, since it may take a long time until a msg3 transmission timing, which mode paging group #1 should operate in is important during a time until the msg3 transmission timing. If information through which the msg3 transmission timing is known is present, paging group #1 may maintain a sleep mode during a predetermined time.

As additional information, if there is information about how many paging groups are present (for the purpose of D2D broadcast) or how many times msg2 is to be transmitted (when paging group classification is uncertain), the msg3 transmission/reception timing may be predicted. Such information about paging groups or the number of msg2 transmissions may be transmitted by an eNB to UEs. A UE transmitting a broadcast/groupcast signal may recognize that msg2 may be transmitted a predetermined number of times and desirably transmits msg3 after last msg2 is transmitted. That is, even though the UE detects msg2 in the middle of transmission, it is desirable not to transmit msg3.

Alternatively, a field indicating how many times msg2 is to be transmitted later may be included in msg2 transmitted by the eNB and the field may be interpreted as a counter for the number of msg2s to be transmitted after each msg2. That is, msg2 when the counter value reaches 0 may be regarded as last msg2. Alternatively, if the msg3 transmission timing can be accurately designated (e.g. a subframe and a radio frame in which msg3 is transmitted) through msg2, the UE need only transmit msg3 only at one timing repeatedly indicated by corresponding msg2s even when msg2 is received multiple times.

As an additional action, an interval between paging groups (an interval between on-durations of paging groups) and an interval between an on-duration of a paging group and msg3 may be basically designated to multiples of an integer of a specific unit or the paging groups or a msg3 transmission/reception timing may be scheduled to have the designated interval. Such a tip is helpful for timing verification. For example, msg2 for paging group (PG)#1 and msg2 for PG#2 may be determined to have an N time unit, msg2 for PG#2 and msg2 for PG#3 may be determined to have an M time unit, and msg2 for PG#3 and msg#3 may be determined to have a K time unit. In this case, N, M, and K are desirably multiples of an integer of a conventional timing unit. The timing unit may be N, M, or K. Alternatively, the timing unit may be a least common multiple or a greatest common divisor of a PO (PF).

Figure 26:
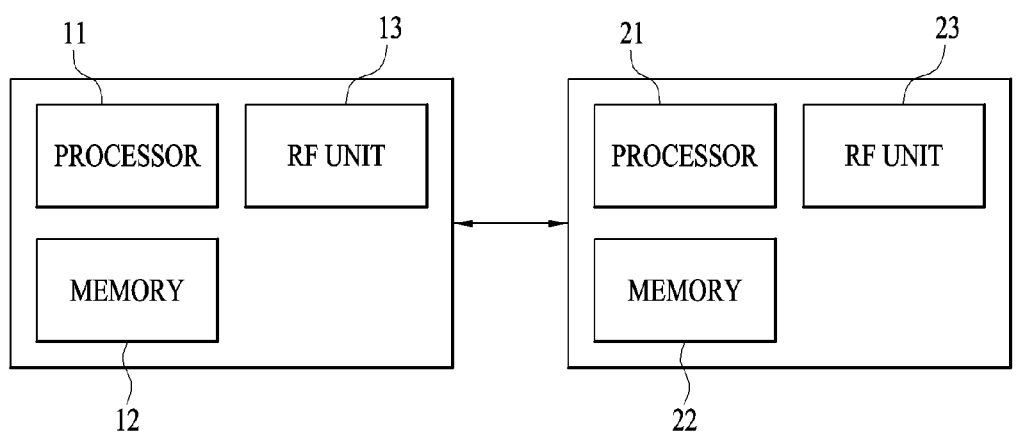
FIG. 26 is a block diagram of communication devices according to an embodiment of the present invention.

FIG. 26 is a block diagram of communication devices according to an embodiment of the present invention.

Referring to FIG. 26, a communication device may include a processor 11, a memory 12, and a radio frequency (RF) module 13. The communication device may perform D2D communication with another communication device including the same configurations 21, 22, and 23.

One communication device of FIG. 26 may be a Tx UE and another communication device of FIG. 26 may be an eNB or an Rx UE. The communication devices of FIG. 26 are illustrated for convenience of description and some modules may be omitted. In addition, the communication devices may further include necessary modules.

In the communication devices, the processors 11 and 21 may perform most of control operations for performing methods according to the embodiments of the present invention. The memories 12 and 22 may be connected to the processors 11 and 21 to store necessary information and the RF units 13 and 23 may transmit and receive RF signals to transmit the RF signals to the processors 11 and 21.

The above-described embodiments are combinations of elements and features of the present invention in a predetermined manner. Each of the elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

The embodiments according to the present invention can be implemented by various means, for example, hardware, firmware, software, or combinations thereof. In the case of a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of a firmware or software configuration, the method according to the embodiments of the present invention may be implemented by a type of a module, a procedure, or a function, which performs functions or operations described above. For example, software code may be stored in a memory unit and then may be executed by a processor. The memory unit may be located inside or outside the processor to transmit and receive data to and from the processor through various well-known means.

The present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are within the scope of the invention.

INDUSTRIAL APPLICABILITY

While the above method for transmitting and receiving signals using D2D communication in a wireless communication system and the apparatus therefor have been described based on an example applied to a 3GPP LTE system, the method and apparatus are applicable to a variety of wireless communication systems in addition to the 3GPP LTE system.

The invention claimed is:

1. A method for supporting a device-to-device (D2D) communication of an idle user equipment (UE) by a base station (BS) in a wireless communication system, the method comprising:
   receiving a first message corresponding to one of a predetermined number of signatures for D2D communication from a D2D transmission (Tx) UE; and
   transmitting a second message including control information for reception of a D2D signal to one or more D2D reception (Rx) UEs including the idle UE,
   wherein the second message causes the idle UE to receive a third message including a D2D broadcast or groupcast signal transmitted by the D2D Tx UE.

2. The method according to claim 1,
   wherein the second message is also transmitted to the D2D Tx UE and additionally includes control information for transmission of a D2D signal.

3. The method according to claim 1,
   wherein the signatures for D2D communication are distinguished from signatures for a random access preamble.

4. The method according to claim 1,
   wherein the BS transmits the second message in consideration of an on-duration of the idle UE.

5. The method according to claim 1,
   wherein the BS transmits the second message during an additional on-duration distinguished from an on-duration of each paging group of the idle UE.

6. The method according to claim 1,
   wherein the BS repeatedly transmits the second message during every on-duration of each paging group of the idle UE.

7. The method according to claim 1,
   wherein the second message includes information about a radio resource on which the third message is transmitted.

8. The method according to claim 7,
   wherein the second message indicates a different timing of each paging group of the idle UE as a reception timing of the third message.

9. The method according to claim 7,
wherein the second message commonly indicates a reception timing of the third message to a paging group of the idle UE.

10. The method according to claim 1,
wherein the D2D Tx UE includes the idle UE and the BS transmits the second message to the one or more D2D Rx UEs so that the D2D Tx UE transmits the third message before RRC connection setup is completed.

11. The method according to claim 1,
wherein the BS receives the third message from the transmission UE to additionally transmit the third message to the one or more D2D Rx UEs.

12. A method for receiving a device-to-device (D2D) signal by an idle user equipment (UE) in a wireless communication system, the method comprising:
receiving a second message including control information for reception of the D2D signal from a base station (BS) during an on-duration; and
receiving a third message including a D2D broadcast or groupcast signal from a transmission (Tx) UE based on control information of the second message,
wherein the second message is determined in consideration of a paging group of the idle UE.

13. The method according to claim 12,
wherein the on-duration during which the second message is received is a duration additionally configured in an on-duration for a DRX operation of the idle UE.

14. A method for performing a device-to-device (D2D) communication by an idle transmission user equipment (UE) in a wireless communication system, the method comprising:
transmitting, by the idle UE not radio resource control (RRC)-connected, a first message to a base station (BS) through a randomly selected resource among predetermined time-frequency resources by randomly selecting one of a predetermined number of signatures for D2D communication;
receiving a second message including control information for transmission of a D2D broadcast or groupcast signal from the BS; and
transmitting a third message including the D2D broadcast or groupcast signal to one or more reception (Rx) UEs using the control information received through the second message.

* * * * *